(12) United States Patent
Tieman

(10) Patent No.: US 11,340,649 B2
(45) Date of Patent: *May 24, 2022

(54) TWO BUTTON REMOTE CONTROL ACTUATOR

(71) Applicant: Blue Eclipse, LLC, Noblesville, IN (US)

(72) Inventor: Craig A. Tieman, Noblesville, IN (US)

(73) Assignee: Blue Eclipse, LLC, Punta Gorda, FL (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/751,695

(22) Filed: Jan. 24, 2020

(65) Prior Publication Data

US 2020/0257330 A1 Aug. 13, 2020

Related U.S. Application Data

(60) Provisional application No. 62/802,405, filed on Feb. 7, 2019.

(51) Int. Cl.
*G05G 7/10* (2006.01)
*B60R 25/20* (2013.01)
*G07C 9/00* (2020.01)

(52) U.S. Cl.
CPC ............ *G05G 7/10* (2013.01); *B60R 25/209* (2013.01); *B60R 25/2072* (2013.01);
(Continued)

(58) Field of Classification Search
CPC .... G05G 7/10; B60R 25/2072; B60R 25/209; B60R 2325/205; B60R 25/002;
(Continued)

(56) References Cited

U.S. PATENT DOCUMENTS

| 4,815,343 A | 3/1989 | Sofinowski |
| 5,748,854 A | 5/1998 | Watanabe et al. |

(Continued)

FOREIGN PATENT DOCUMENTS

| EP | 3279882 A1 | 2/2018 |
| KR | 2007026743 A | 3/2007 |

(Continued)

OTHER PUBLICATIONS

International Search Report and Written Opinion for International Application PCT/US2014/072177 dated Apr. 27, 2015.

*Primary Examiner* — Daryl C Pope
(74) *Attorney, Agent, or Firm* — Andrus Intellectual Property Law, LLP

(57) ABSTRACT

An actuation system used to actuate two buttons on a remote control device, such as a key fob, based upon commands that are generated from a mobile device. The actuation system includes an outer housing that defines an isolation enclosure. The actuation system includes a support frame that allows the vertical position of the button actuator to be manually adjusted. The lateral and longitudinal position of the actuator can also be manually adjusted, as can the distance between a pair of actuator tips. The controller receives the command signals from the mobile device and converts the command signals into actuation commands that are used to activate a servo motor to move the one of two actuation tips into contact with one of the buttons of the key fob. The system includes a RF receiver and transmitter to communicate a vehicle command signal for receipt by the vehicle.

20 Claims, 28 Drawing Sheets

(52) U.S. Cl.
CPC ..... *G07C 9/00896* (2013.01); *G07C 9/00944* (2013.01); *B60R 2325/205* (2013.01)

(58) Field of Classification Search
CPC ............ G07C 9/00896; G07C 9/00944; G07C 9/00174; G07C 2009/00984; G08C 2201/30; G08C 17/02; H01H 9/0235
See application file for complete search history.

(56) References Cited

U.S. PATENT DOCUMENTS

| | | | |
|---|---|---|---|
| 6,008,636 A | 12/1999 | Miller et al. | |
| 6,405,099 B1 | 6/2002 | Nagai et al. | |
| 8,241,271 B2 | 8/2012 | Millman et al. | |
| 8,560,118 B2 | 10/2013 | Greer et al. | |
| 8,679,096 B2 | 3/2014 | Farritor et al. | |
| 8,761,938 B2 | 6/2014 | Jenkinson et al. | |
| 8,996,166 B2 | 3/2015 | Jenkinson | |
| 8,996,244 B2 | 3/2015 | Summer et al. | |
| 9,026,250 B2 | 5/2015 | Summer et al. | |
| 9,126,332 B2 | 9/2015 | L'Ecuyer et al. | |
| 9,188,973 B2 | 11/2015 | Tenney et al. | |
| 9,409,297 B2 | 8/2016 | Tieman | |
| 9,576,414 B2 | 2/2017 | Tieman | |
| 2002/0084694 A1 | 7/2002 | Quesnel et al. | |
| 2004/0021553 A1* | 2/2004 | Hsieh ................... E05B 47/0012 340/5.64 |
| 2004/0227615 A1* | 11/2004 | John ....................... B60R 25/04 340/5.61 |
| 2005/0231595 A1 | 10/2005 | Wang et al. | |
| 2007/0096938 A1 | 5/2007 | Lopez et al. | |
| 2007/0282483 A1 | 12/2007 | Kraft | |
| 2009/0108989 A1 | 4/2009 | Sinclair | |
| 2010/0198402 A1 | 4/2010 | Greer et al. | |
| 2012/0285208 A1* | 11/2012 | Delande ................ E05B 19/043 70/399 |
| 2012/0316686 A1 | 12/2012 | Dueckman | |
| 2014/0309775 A1 | 10/2014 | Jenkinson | |
| 2015/0217445 A1 | 8/2015 | Hietmann | |
| 2015/0251317 A1 | 9/2015 | Matsukuma | |
| 2016/0343190 A1* | 11/2016 | Tieman .............. G07C 9/00309 |
| 2020/0019304 A1* | 1/2020 | Mead .................. G06F 3/04817 |
| 2020/0055487 A1* | 2/2020 | Tieman .................... G07C 9/29 |
| 2020/0219383 A1* | 7/2020 | Tieman .............. G07C 9/00571 |

FOREIGN PATENT DOCUMENTS

| | | |
|---|---|---|
| WO | 2006084330 A1 | 8/2006 |
| WO | 2015100337 A1 | 7/2015 |

\* cited by examiner

TWO BUTTON REMOTE CONTROL ACTUATOR

CROSS REFERENCE TO RELATED APPLICATION

The present application is based on and claims priority to U.S. Provisional Patent Application Ser. No. 62/802,405, filed Feb. 7, 2019, the disclosure of which is incorporated herein by reference.

BACKGROUND

Electronic systems in automotive vehicles and other devices may utilize handheld remote controls with finger-pressable buttons. These devices can be utilized to remotely actuate vehicle or device functions by hand, where such functions may be difficult to access otherwise by a vehicle operator. The remote controls of these electronic systems generally permit secure remote actuation of unlocking, locking, power door and trunk opening, remote engine starting, activation of horns, lights and panic features as well as other types of vehicle or device functions.

In recent years, the rapid and widespread growth in long-range wireless connectivity and sophisticated hand-held mobile devices with touch-type graphical user interfaces and short or long-range wireless connectivity has led to the proliferation of machine-to-machine connectivity solutions and "anywhere at any time" device interactivity. Consumers now expect all of their vehicles, homes and devices to be connected and able to be interacted with via their mobile technology from anywhere and at any time.

An increasing number of new vehicles come equipped with built-in wireless connectivity that enables connectivity to these vehicles via mobile devices and web-enabled devices for remote function actuation. Vehicles from General Motors, for example, equipped with ONSTAR telematics connectivity can be remotely started or unlocked with a smartphone running a downloaded software application ("app"). This is a proprietary, designed-in solution available only to purchasers of these vehicles and requires the purchase of an ongoing subscription from ONSTAR for the cellular data connectivity to the vehicle to enable this function.

It is generally known that vehicle electronics suppliers have been offering retrofitted systems to expand the remote control capabilities available to vehicle owners. Directed, for example, offers aftermarket systems that control more functions and provide longer-range of connectivity, including the addition of telematics communications for control from any location with a smartphone application. One primary limitation of these systems includes the need for extensive custom engineering efforts to enable the electronics to interface to and work with the electronics of the vehicles. In addition, consumers may be required to employ a professional technician for all installation efforts due to the technical complexity of the different vehicle installations. Consequently, these installations are generally expensive for consumers to consider.

More recently, suppliers of aftermarket vehicle electronics have introduced systems that consumers can self-install at low-cost and complexity. Aptiv, for example, introduced a system that can be plugged into a standardized on-board diagnostics (OBD-II) connector found on all light-duty vehicles since 1996. The vehicle owner can easily install the system and, after downloading a smartphone application, can have remote control of vehicle access functions from their smartphone or a web-enabled device. By leveraging features found standard in many vehicles, this system advantageously allows for the addition of a new radio-frequency (RF) transmitter to operate as a secure remote control using procedures built into the vehicle by its manufacturer. Other suppliers are attempting to reverse engineer data bus commands for each vehicle to permit long-range remote control of the functions of the vehicle by transmitting data bus commands onto the OBD-II connector from a consumer-installed device. The main limitations of the RF control technique are that many vehicles do not have any available method for adding a new transmitter by the owner. Additionally, many vehicles have such sophisticated secure RF designs that no method can be found practically to transmit the proper secure codes to a vehicle.

The main limitation of a data bus control technique is the extensive effort to reverse-engineer data bus commands for each vehicle. Additionally, many vehicles cannot be controlled via this connector at some or all of the time, such as when an owner is away from their vehicle due and/or due to a lack of available data bus commands.

U.S. Patent Publication No. 2009/0108989 A1 describes a remote control actuation system using a controller and solenoid(s) to press one or two remote control actuation buttons of a vehicle remote control. The system would be placed in a location within the confines of the vehicle. The '989 application describes an actuation method specific to a single type of remote control with a specific button location layout. The '989 application also fails to accommodate the numerous and widely-varying remote control multi-button designs found on vehicle remote control fobs, for example. Vehicle remote controls can have from 2 to 8 buttons in any type of layout and orientation on up to 3 surface planes of the remote control, varieties of package sizes and designs without a mechanical key blade and ones with fixed or movable mechanical key blades.

Therefore, there is a need in the art for a remote control to control the functions of a vehicle and/or other device, specifically for a singular design for wireless connectivity enhancements of linkage to mobile devices which can be added to all existing vehicle or device remote control systems without special tools or training.

BRIEF SUMMARY

The presently disclosed embodiments, as well as features and aspects thereof, are directed towards a remote control button actuation system that includes two button actuator tips to actuate two buttons on a remote control for vehicle or device. In one embodiment of the disclosure, the button actuator tips can be manually moved into position above the surface of the remote control. Once positioned over remote control buttons, the button actuator tips may be activated to press one of the remote control buttons. A servo motor may be controlled by a programmable controller that receives signals from a mobile device via short or medium-range wireless signals.

In accordance with another embodiment of the present disclosure, the actuation system includes an isolation enclosure that is designed to prevent radio frequency (RF) signals from entering into or leaving an open interior of the isolation enclosure. The isolation enclosure is preferably formed from a metallic material to prevent the transmission of the RF signals. The isolation enclosure completely surrounds a key fob remote control that is located on a remote control support within the open interior of the isolation enclosure.

The outer housing securely receives and retains the key fob in a known location within the open interior.

A controller is configured to receive command signals from a mobile device. Based upon the command signals received from the mobile device, the controller converts the command signals into activation commands used to actuate the button actuator. Since the key fob is positioned within the isolation enclosure, a transmitting antenna is used to transmit vehicle command signals out of the housing for receipt by the operating systems within the vehicle.

A key fob antenna is positioned within the isolation enclosure to receive the control signals from the key fob and communicate these signals to the controller. Based upon the received signals from the key fob, the transmitter retransmits the control signals received from the key fob as the vehicle command signals. In this manner, the actuation system is able to isolate the key fob and controller from outside RF signals while still allowing the key fob and controller to transmit vehicle command signals to the vehicle.

The actuation system of the present disclosure includes one or more button actuators that can be operated to depress a pair of buttons on a key fob. In one embodiment, the actuation system includes a servo motor that rotates in a clockwise or counterclockwise direction to cause depression of one of two different buttons on the key fob. The actuation system can include a pair of button actuators that can be manually positioned relative to a fixed location of the key fob.

BRIEF DESCRIPTION OF THE SEVERAL VIEWS OF THE DRAWING

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Aspects, features and advantages of several exemplary embodiments of the remote button actuation system will become better understood with regard to the following description in connection with the accompanying drawing(s). It should be apparent to those skilled in the art that the described embodiments of the present description provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present description as defined herein and equivalents thereto. Hence, use of absolute terms such as, for example, "will," "will not," "shall," "shall not," "must" and "must not" are not meant to limit the scope of the present description as the embodiments disclosed herein are merely exemplary.

The word "exemplary" is used herein to mean "serving as an example, instance, or illustration." Any aspect described herein as "exemplary" is not necessarily to be construed as exclusive, preferred or advantageous over other aspects.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Figure 1:
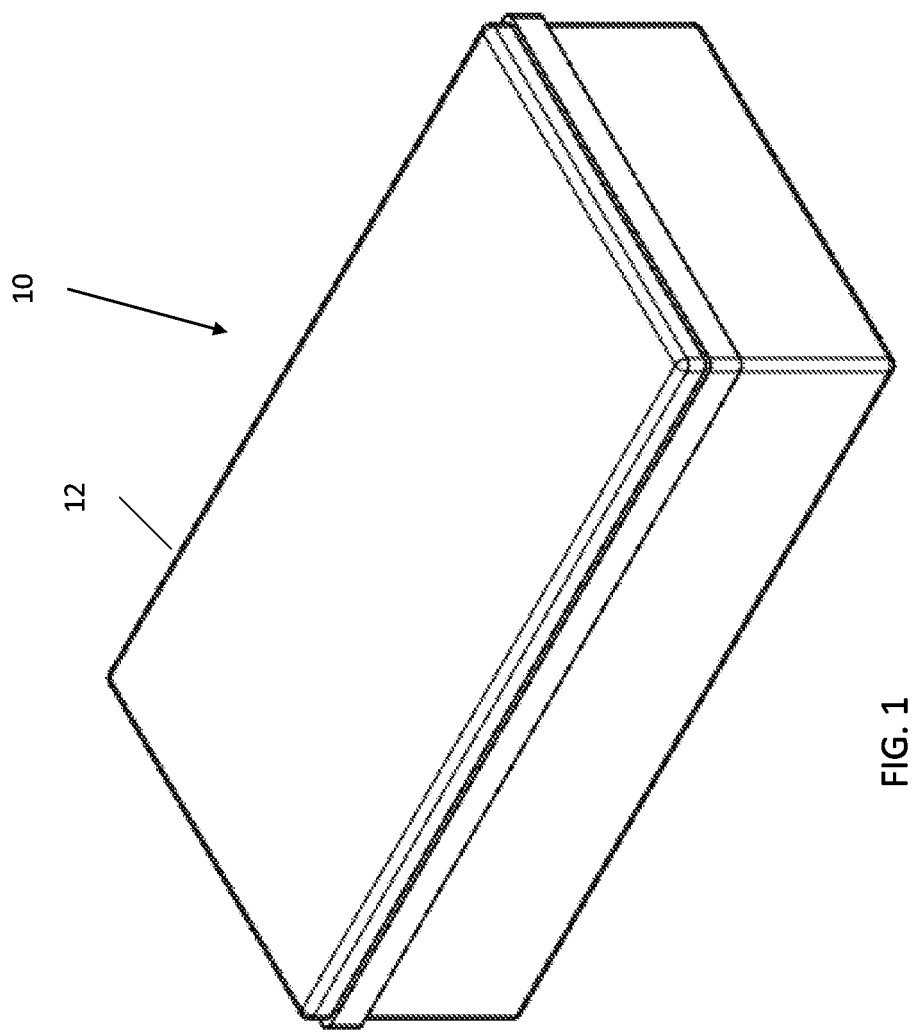
FIG. 1 is a perspective view of the outer housing of the actuation system of the present disclosure.

FIG. 1 illustrates an actuation system 10 used to actuate a remote control constructed in accordance with the present disclosure. The actuation system 10 shown in FIG. 1 includes an outer housing 12 that defines an open interior that receives a remote control, such as a key fob, as will be described in greater detail below. The outer housing 12 is designed to be placed within a vehicle that has various systems operated utilizing the key fob. The size of the outer housing 12 is designed such that it can be easily and securely contained within the open interior of a vehicle. The outer housing 12 is designed to surround one of multiple different configurations for the key fob as will be described in greater detail below.

Figure 2:
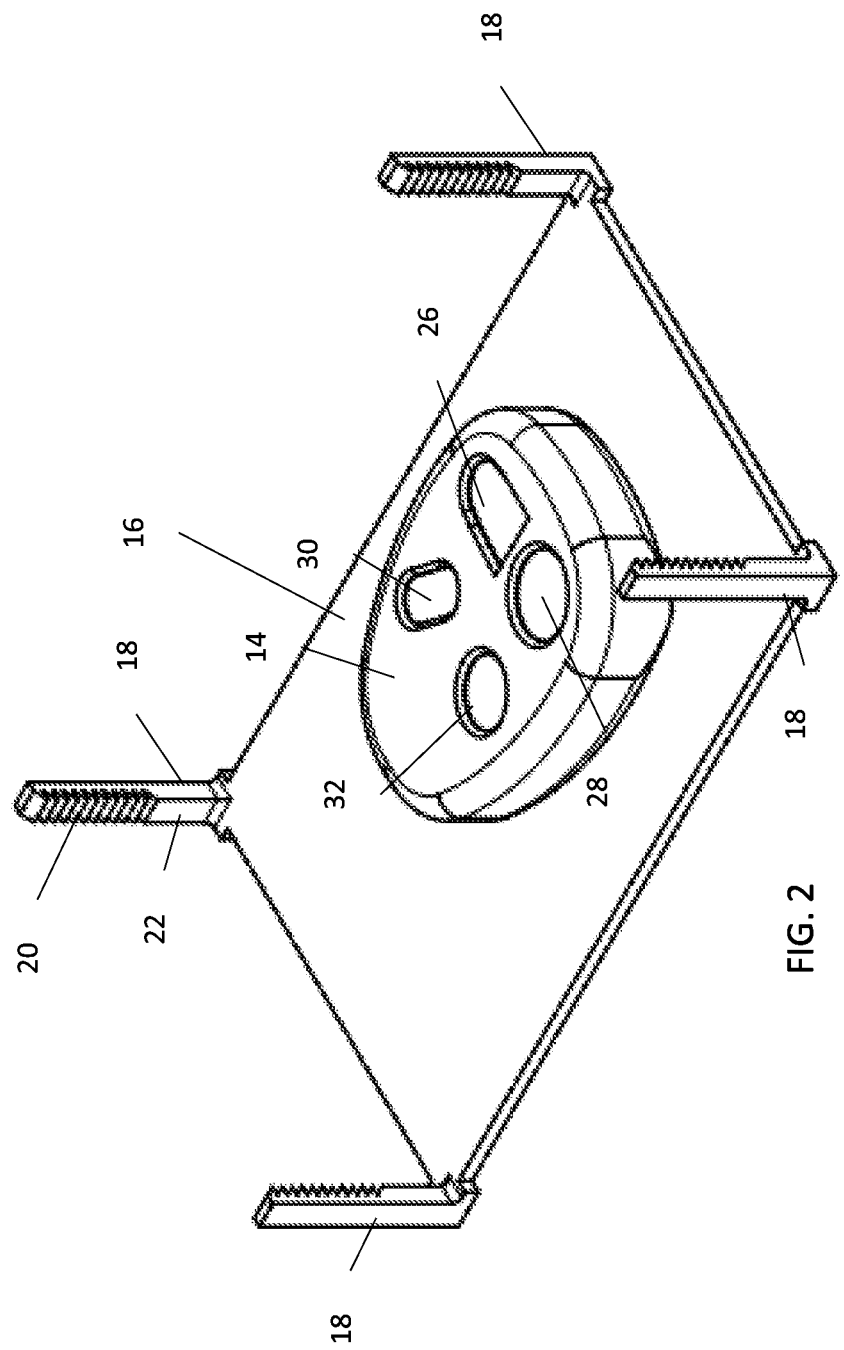
FIG. 2 is a view of a remote control, such as a key fob supported on a support plate.

FIG. 2 illustrates components of a first embodiment of the actuation system. In the embodiment shown in FIG. 2, the key fob 14 is securely positioned on a bottom plate 16. The key fob 14 may be securely positioned utilizing various types of adhesive or other similar components that hold the key fob 14 in a secure location on the support surface defined by the bottom plate 16. In the embodiment shown in FIG. 2, the bottom plate 16 includes a plurality of adjustment posts 18 that are located at the outer corners of the bottom plate 16. Each of the adjustment posts 18 includes a series of teeth 20 formed along one of the flat surfaces 22. The teeth 20 create distinct points of adjustment for side rails to define distinct vertical positions as will be described in greater detail below. In the embodiment shown in FIG. 2, the bottom plate 16 and the adjustment posts 18 are integrally formed from a molded plastic material.

The key fob 14 shown in FIG. 2 includes four buttons. Specifically, the key fob 14 includes a lock button 26, an unlock button 28, a trunk open button 30 and an emergency button 32. In accordance with the present disclosure, the actuation system is designed to depress only two of the four buttons shown. In the embodiment described below, the actuation system is used to depress the lock button 26 and the unlock button 28.

Figure 3:
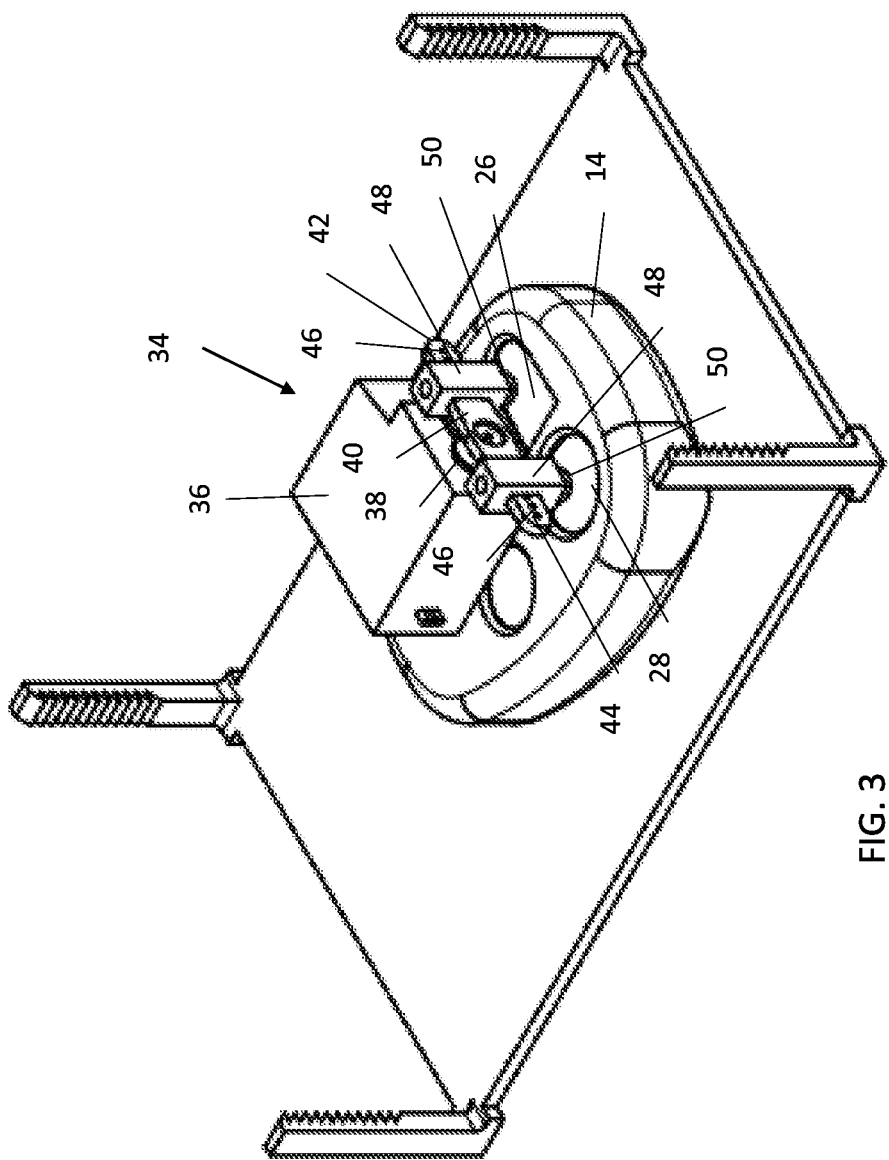
FIG. 3 is a view illustrating the button actuator aligned with two buttons on the key fob.

FIG. 3 illustrates the position of a button actuator 34 aligned with the two buttons 26, 28 of the key fob 14. The button actuator 34 is operable to depress either one of the two buttons 26, 28 upon receiving a command signal from a remote device, such as a smartphone. The button actuator 34 includes a servo motor 36 that can be actuated to rotate a motor shaft 38. The servo motor 36 can be actuated to rotate the motor shaft 38 in either a clockwise or counter-clockwise direction.

In the embodiment shown in FIG. 3, an actuator arm 40 is securely mounted to the motor shaft 38. When the motor shaft 38 rotates in the clockwise direction, first end 42 of the actuator arm 40 moves downward toward the key fob 14. When the motor shaft 38 rotates in the counterclockwise direction, the second end 44 of the actuator arm 40 moves downward toward the key fob 14. The first and second ends 42, 44 of the actuator arm are on opposite sides of the motor shaft 38.

The actuator arm 40 includes a series of raised detents 46 that provide distinct and secure points of attachment for each of a pair of mounting blocks 48. The mounting blocks 48 include a generally rectangular body portion and an actuator tip 50. The mounting block 48 includes an internal slot that allows the mounting block 48 to slide along the actuator arm and into a desired location along the actuator arm. The detents 46 hold the mounting blocks 48 in position.

As can be understood in FIG. 3, when the motor shaft 38 rotates in a clockwise direction, the actuator tip 50 of the mounting block 48 positioned on the first end 42 of the actuator arm 40 moves downward and into contact with the lock button 26. Likewise, rotation of the motor shaft 38 in the counterclockwise direction causes the actuator tip 50 of the mounting block 48 located on the second end 44 to move into contact with the unlock button 28. In this manner, the servo motor 38 can rotate the motor shaft 38 to depress either one of the two buttons 26, 28.

Figure 4:
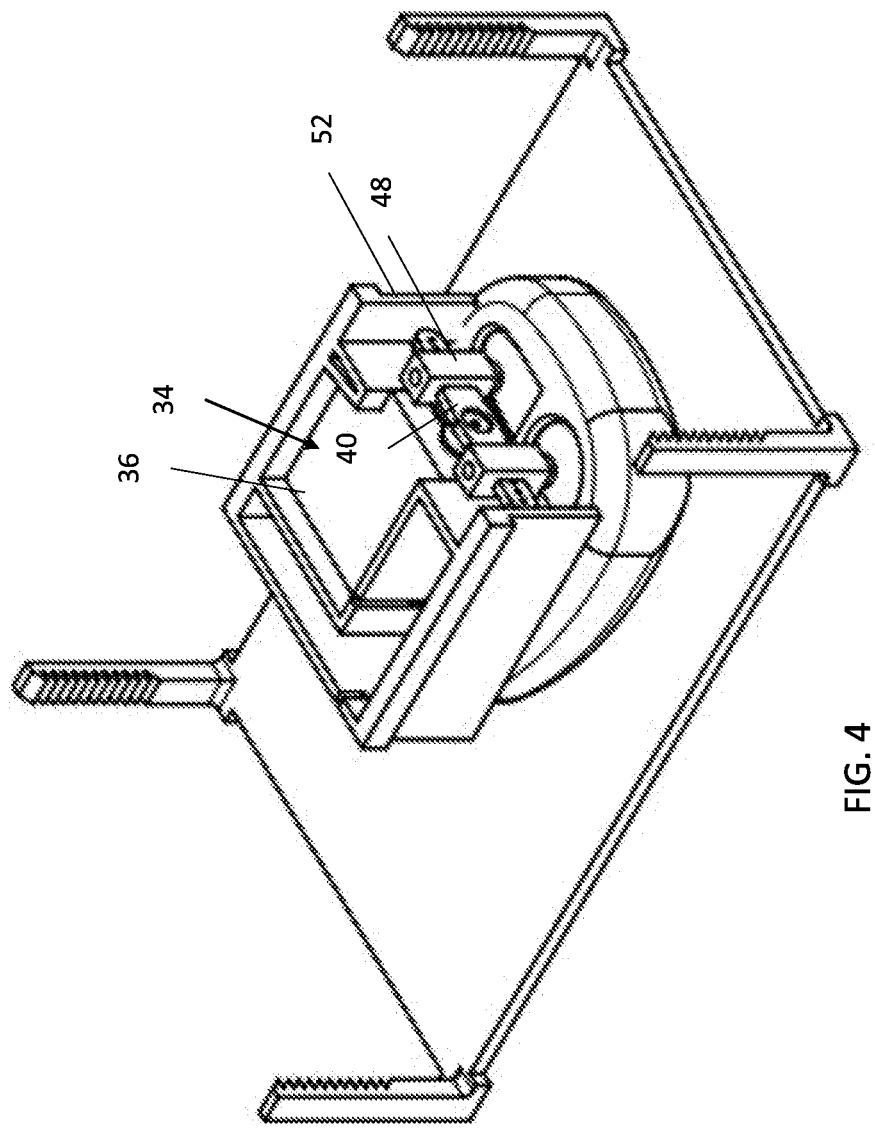
FIG. 4 is a view showing the mounting of the button actuator within a support housing.

As illustrated in FIG. 4, the actuator 34, and specifically the servo motor 36, is mounted within a support housing 52. The support housing 52 is designed specifically to retain the servo motor 36 while allowing for the rotation of the actuator arm 40 and the linear movement of the mounting blocks 48 along the actuator arm 40.

Figure 5:
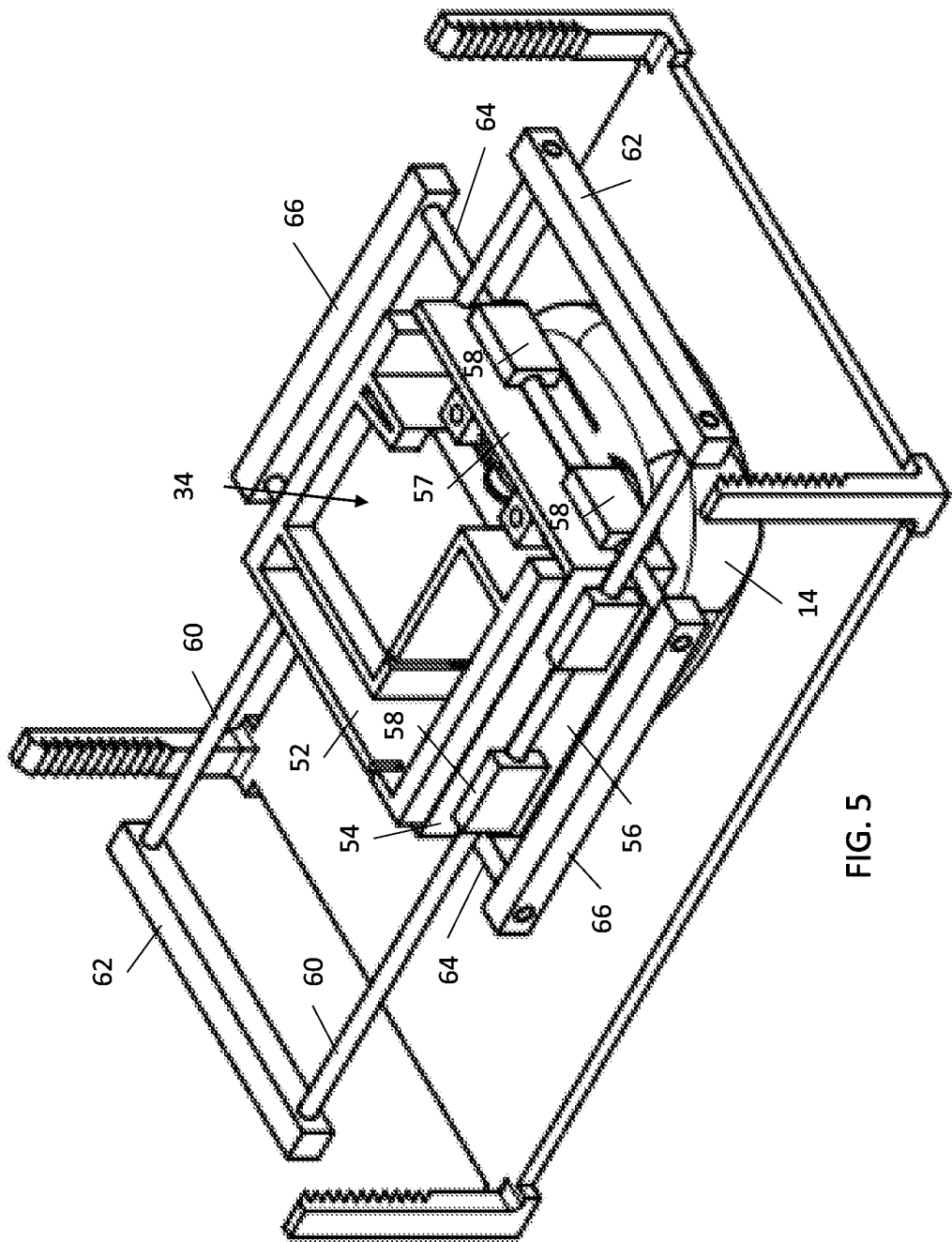
FIG. 5 illustrates the lateral and longitudinal adjustment mechanisms for the support housing.

Referring now to FIG. 5, the support housing 52 is supported by a mounting frame 54 that includes a plurality of side walls 56 and end walls 57 that define a generally rectangular enclosure. Each of the side walls 56 and end walls 57 includes a pair of slide blocks 58. The slide blocks 58 combine to allow both lateral and longitudinal adjustment of the support housing 52, and thus the actuator 34 and actuator tip 50, relative to the fixed position of the key fob 14.

The lateral adjustment of the support housing is carried out through a pair of lateral support rods 60 that are each connected at their opposite ends to a support bar 62. Each of the support rods 60 is fixed and passes through a pair of the slide blocks 58 formed on each of the lateral side walls 56. The slide blocks 58 create a friction fit along the outer surface of the support rod 60. In this manner, the user can slide the entire support housing 52 along the length of the support rods 60 until the actuator tips are aligned with the buttons of the key fob.

The lateral position of the support housing 52 is adjusted through a second pair of support rods 64. Each of the support rods 64 is secured at its outer end to a support bar 66. The support rods 64 each extend through a pair of the slide blocks 58 formed on the front and back end walls 57 of the mounting frame 54. The frictional interaction between the slide blocks 58 and the outer surface of the support rods 64 holds the support housing 52 in the desired position above the key fob 14. As can be understood, a user can adjust the position of the support housing 52 by sliding the support housing laterally along the support rods 64 and longitudinally along the support rods 60. Likewise, the distance between the actuator tips can be adjusted along the length of the actuator arm 40, as was shown in FIG. 3.

Figure 6:
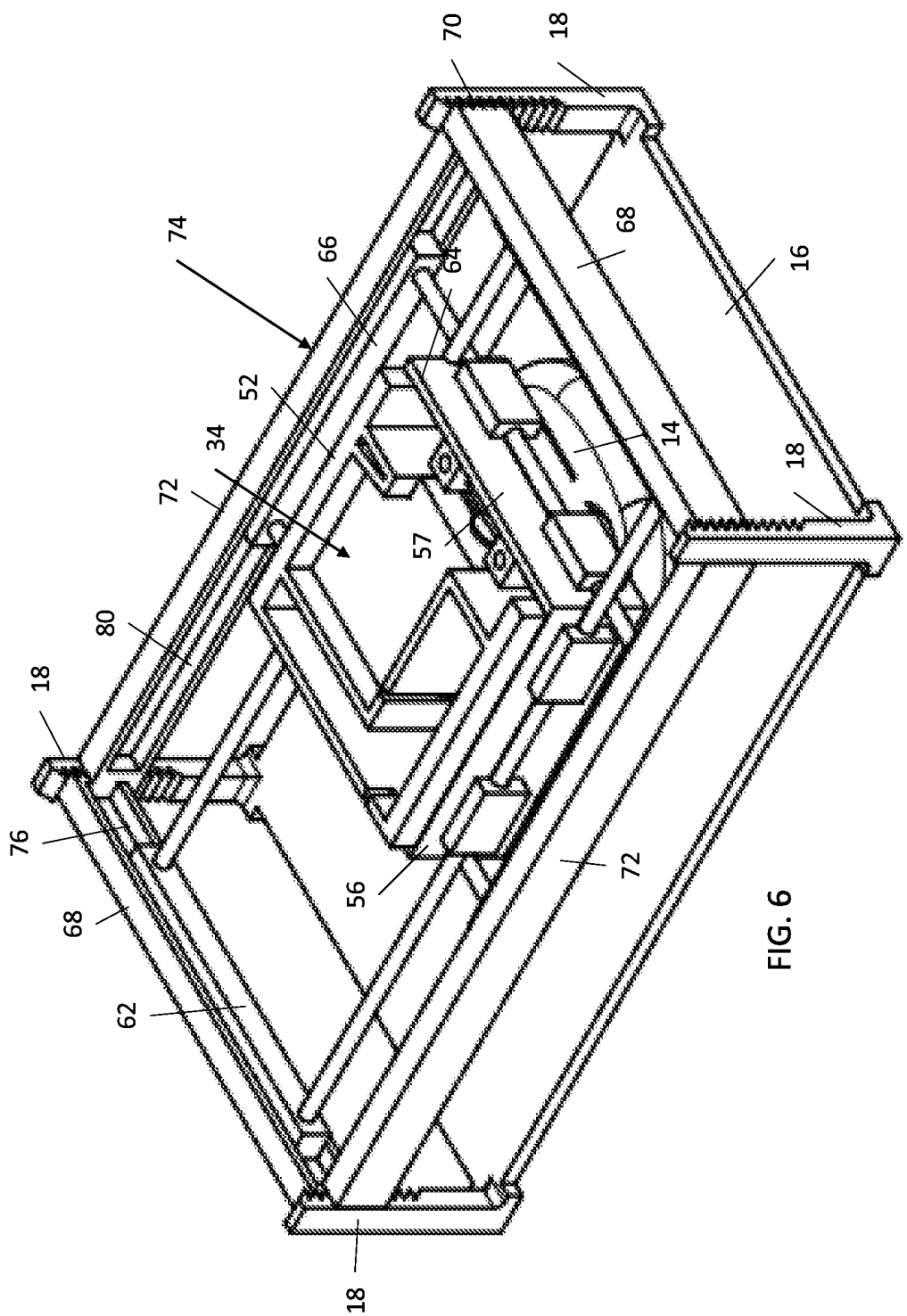
FIG. 6 is a view illustrating the support frame.

FIG. 6 illustrates the physical elements that allow for the vertical adjustment of the support housing 52. As shown in FIG. 6, a pair of end rails 68 is mounted between the adjustment posts 18 at the front and the rear of the bottom plate. The end rails 68 include teeth 70 that interact with the teeth 20 formed on the adjustment posts 18. The front and rear end rails 68 are integrally formed with a pair of side rails 72 to define a complete support frame 74. The entire support frame 74 can move vertically along the spaced adjustment posts 18 to adjust the vertical position of the support housing 52 and thus the entire actuator 34 relative to the stationary key fob 14. As illustrated in FIG. 6, the front and rear support bars 62 are each received within an open channel 76 formed in one of the end rails 68 while the lateral support bars 66 are received within corresponding channels 80 formed in the side rails 72.

As can be understood by the above drawing figures, the manual position of the actuator tips can be adjusted laterally, longitudinally, vertically and the spacing between the actuator tips can be adjusted along the length of the actuator arm 40. Thus, once the key fob 14 is securely positioned on the bottom plate 16, the user can adjust the actuation system such that the actuator tips are properly aligned with the two key fob buttons to be depressed and are vertically spaced the desired distance above the key fob.

Figure 7:
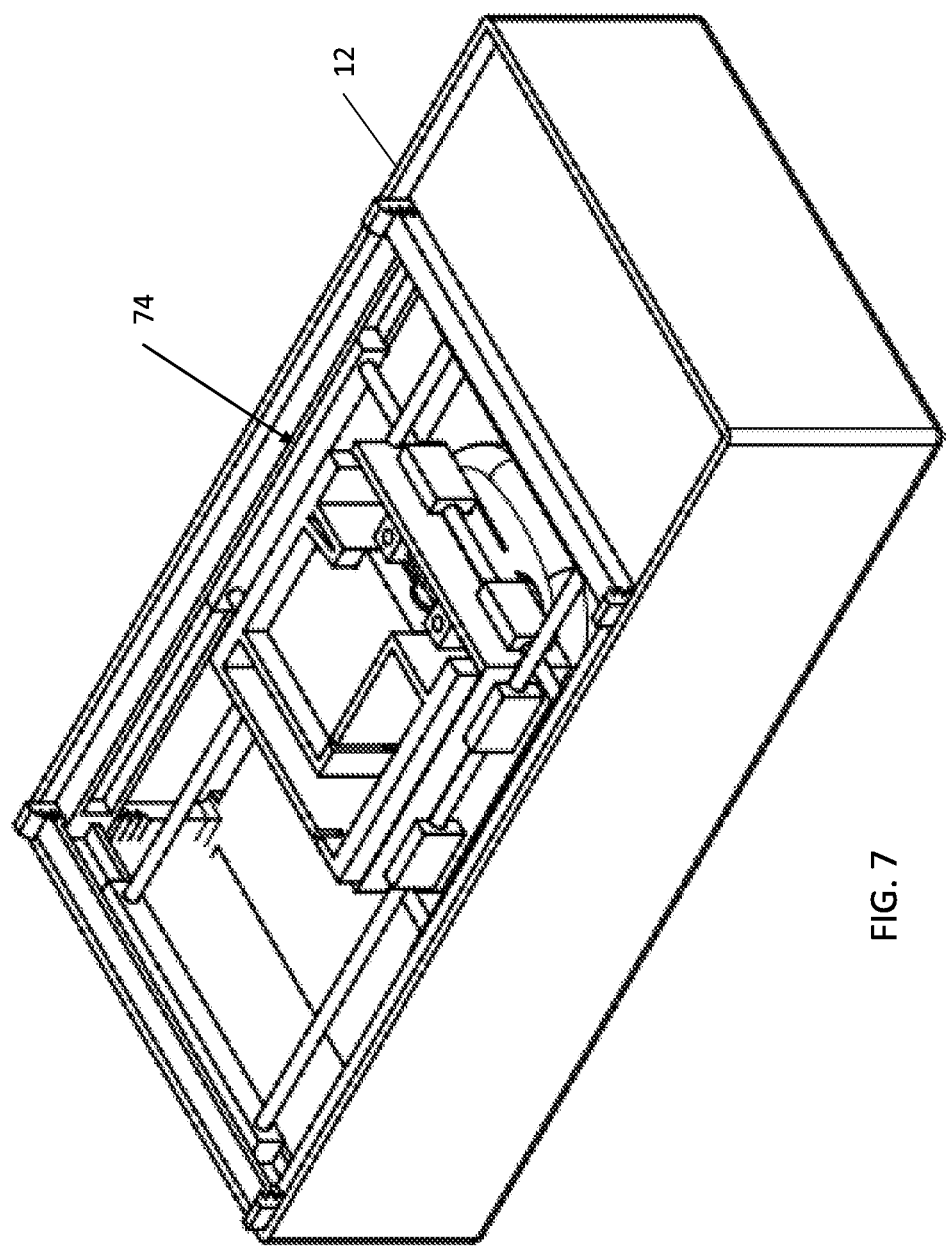
FIG. 7 is a view of the support frame within the outer housing with a cover removed.

FIG. 7 illustrates the location of the actuator support frame 74 within the outer housing 12.

Figure 8:
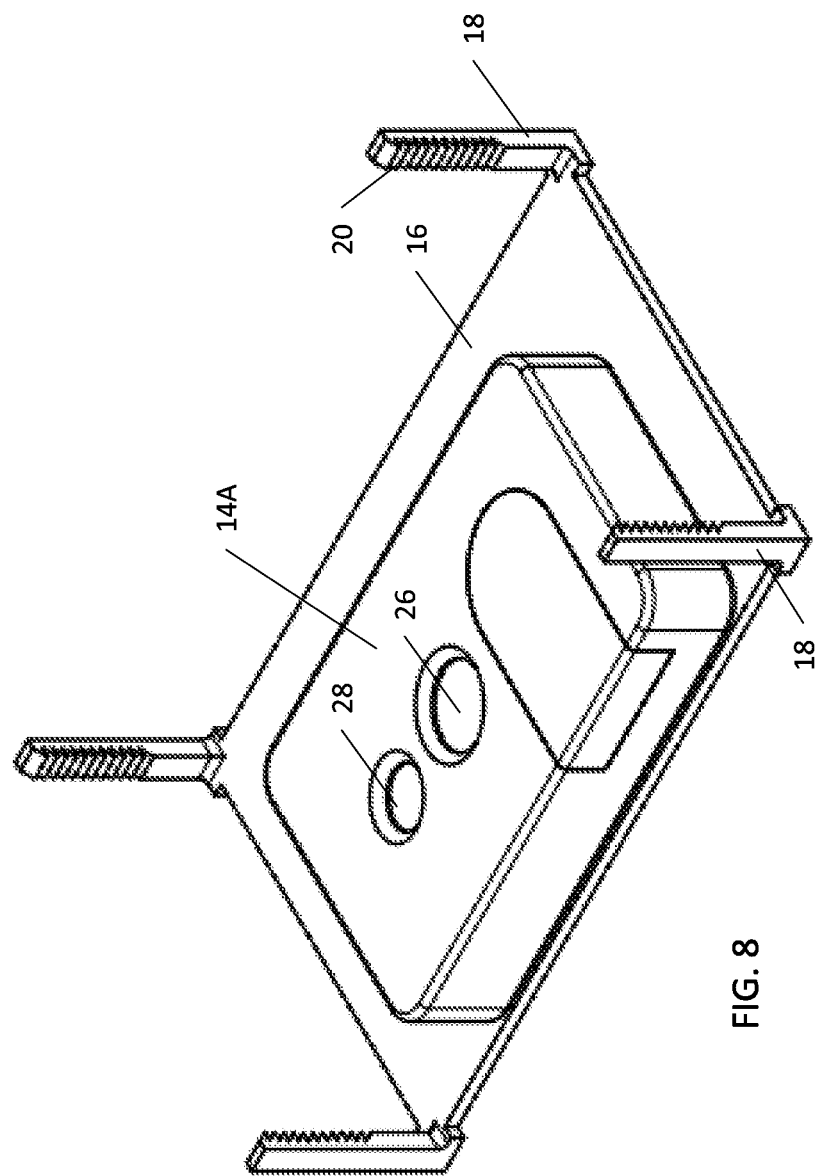
FIG. 8 is a view similar to FIG. 2 with an alternate remote control key fob.
Figure 9:
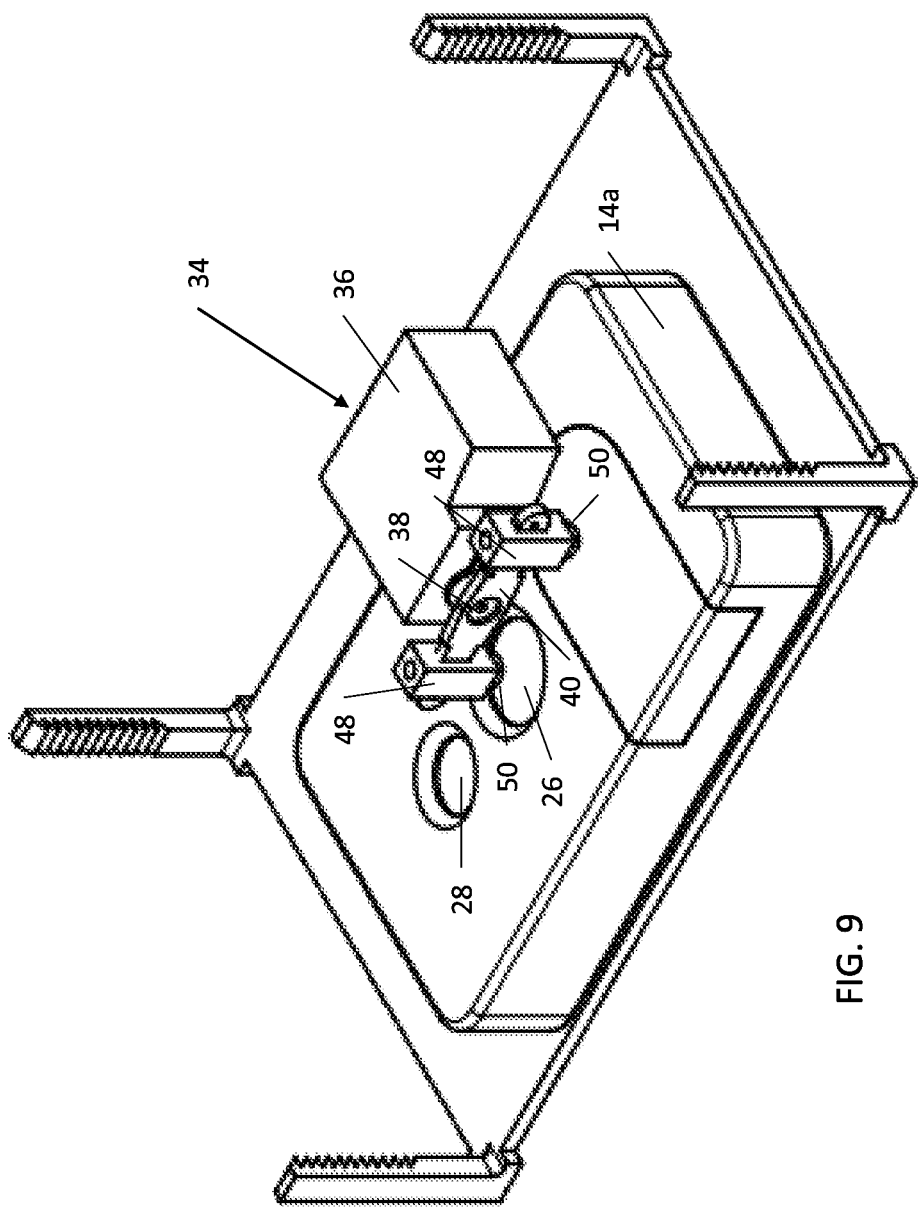
FIG. 9 is a view illustrating the button actuator aligned with two buttons on the key fob.
Figure 10:
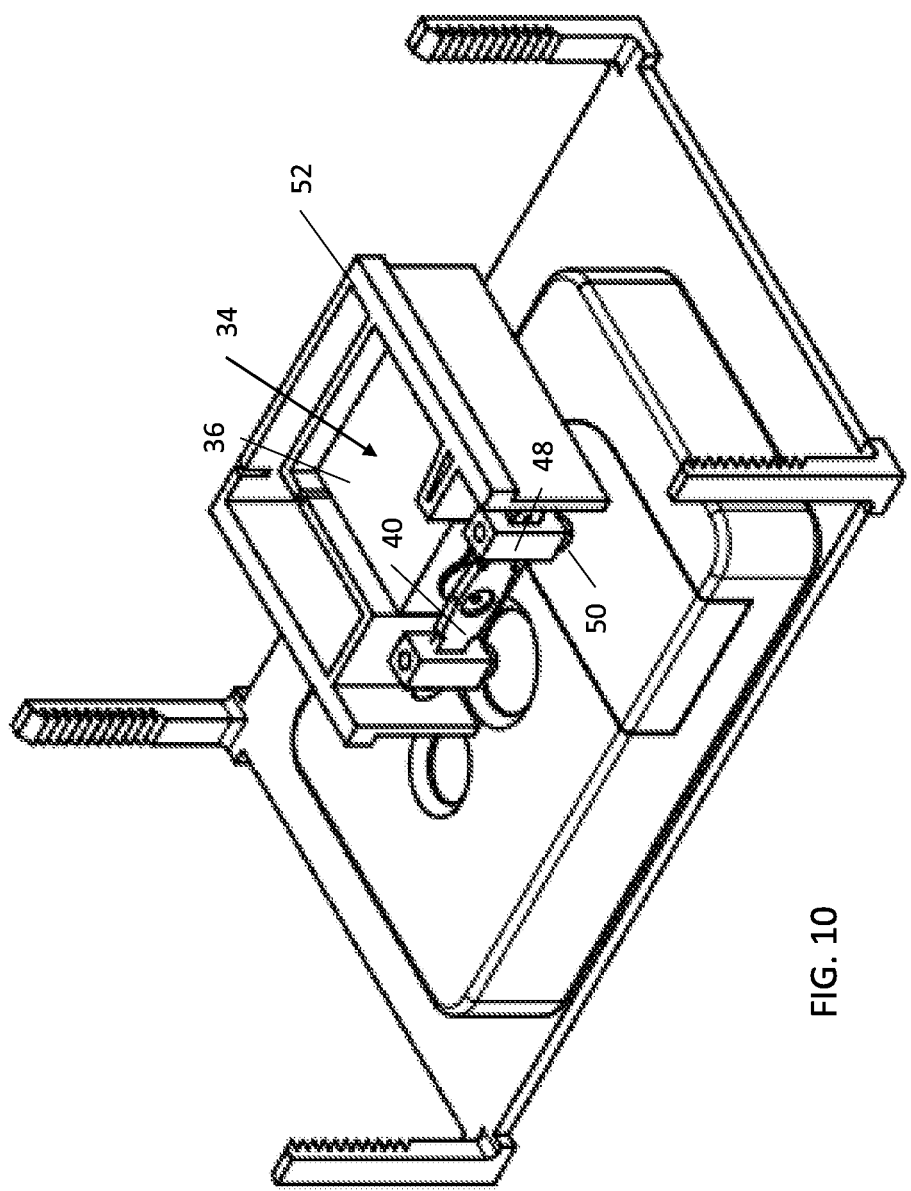
FIG. 10 is a view showing the mounting of the button actuator within a support housing.
Figure 11:
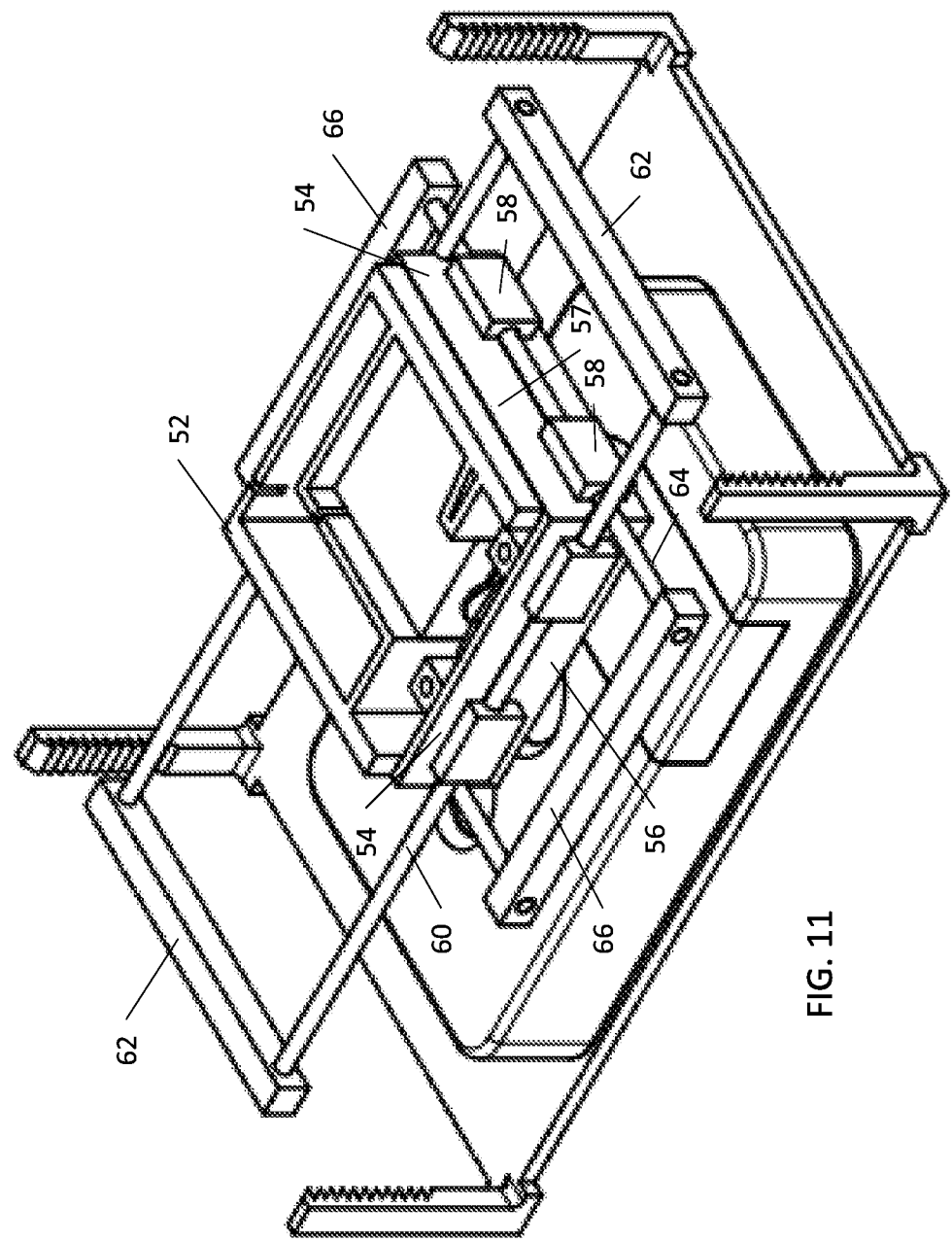
FIG. 11 illustrates the lateral and longitudinal adjustment mechanisms for the support housing.
Figure 12:
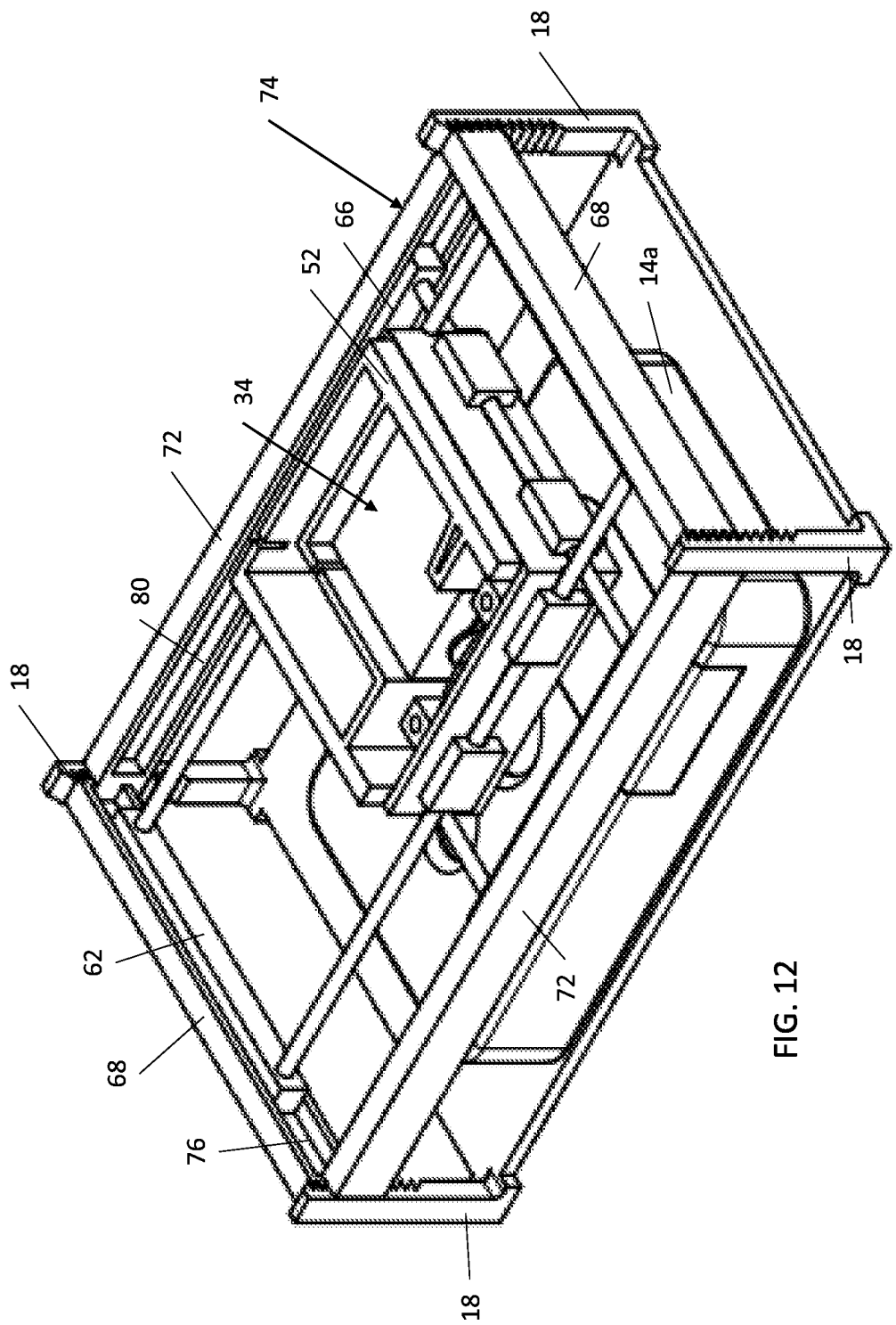
FIG. 12 is a view illustrating the support frame.
Figure 13:
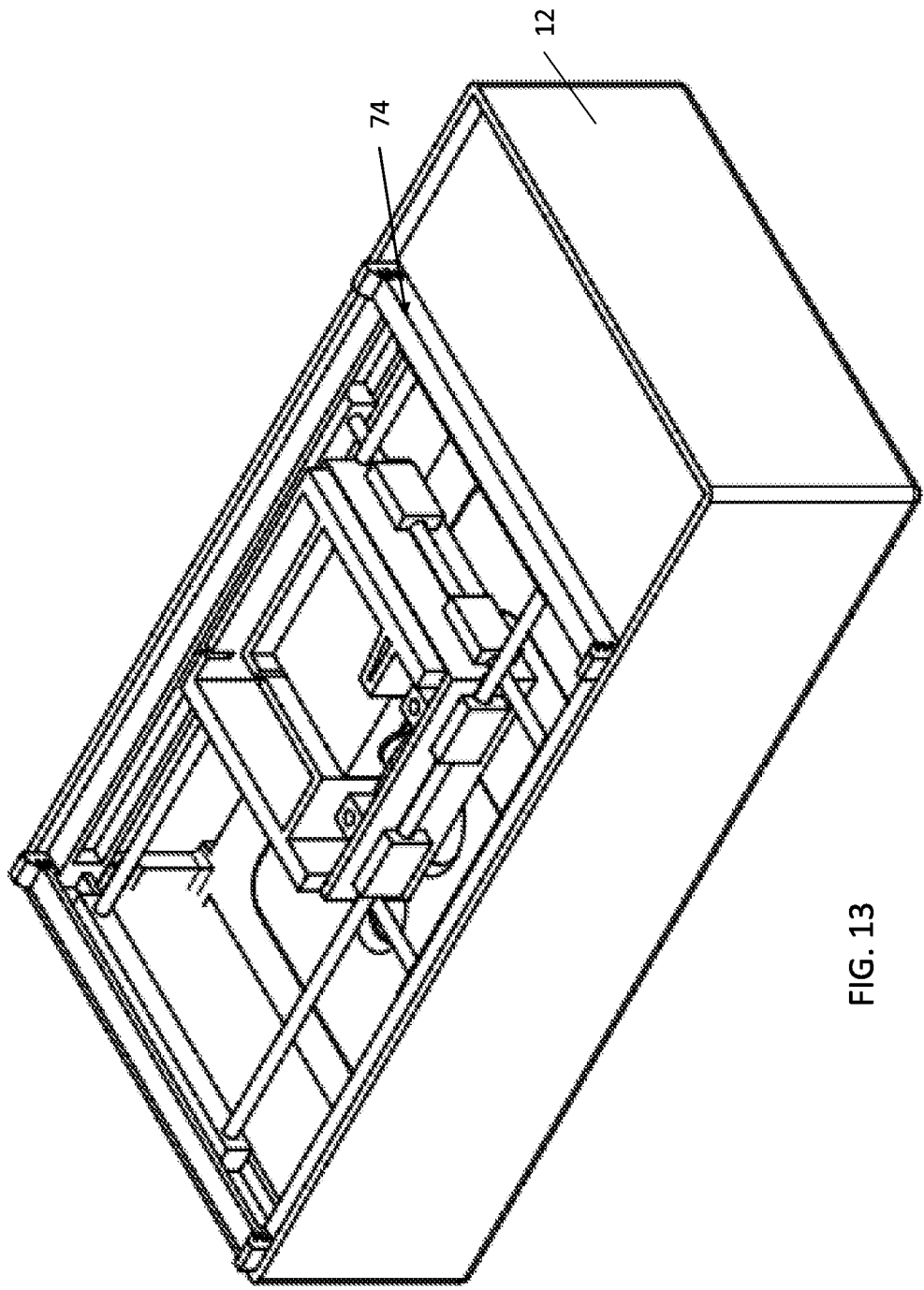
FIG. 13 is a view of the support frame within the outer housing with a cover removed.

FIG. 8 illustrates a second type of key fob 14A that is located on the bottom plate 16. In the embodiment shown in FIG. 8, the key fob 14A has two buttons, namely the lock button 26 and the unlock button 28. However, the orientation of the lock button 26 and the unlock button 28 are different from the orientation shown in the key fob 14 of FIG. 2. To accommodate this configuration, the orientation of the servo motor 36 is rotated 90°, as can be seen in the comparison of FIG. 9 to FIG. 3. This change in orientation also results in a change in orientation of the support housing 52, as shown in FIG. 10. As illustrated in FIG. 11, the support housing 52 is again supported by the mounting frame 54 which includes the series of side walls 56 and end walls 57. The support rods 60 allow for the longitudinal adjustment while the support rods 64 again allow for the lateral adjustment of the support housing 52. The same support frame 74 as described previously, allows for the vertical adjustment of the support housing 52, as previously described. As shown in FIG. 13, the outer housing 12 again surrounds the support frame 74.

As can be understood in the second embodiment of FIGS. 8-13, the actuation system can be utilized with different types of remotes that include two buttons that need to be depressed. The actuation system of the present disclosure allows for the manual adjustment of the location of the actuator 34. Thus, the actuation system of the present disclosure is simplified and allows the user to adjust the location of the actuator a single time for use with a specific key fob.

Figure 14:
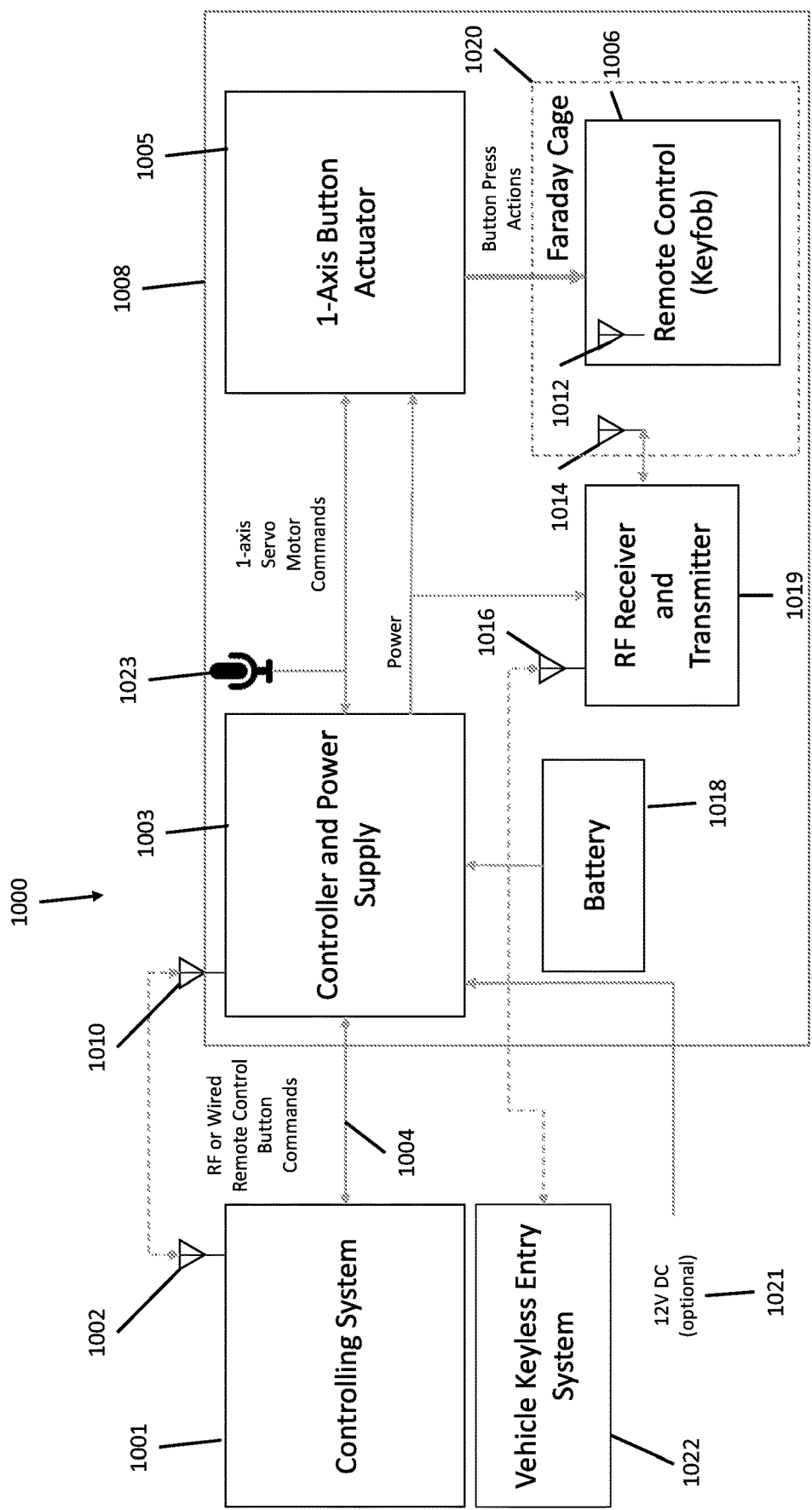
FIG. 14 is a schematic illustration showing the operating components of the actuation system of the present disclosure.

FIG. 14 illustrates a mechanization diagram of the remote control button actuation system 1000 in accordance with an exemplary embodiment of the present disclosure. In the embodiment shown in FIG. 14, the controlling system 1001 may be a mobile device, such as a smartphone, which operates to send user commands via wireless RF through antenna 1002 or other wireless technology, including optical and audible technology, to the controller 1003.

Once the remote control (key fob) is initially positioned within the drawer 3 and the drawer is closed, the controller 1003 activates the servo-motor to move the actuator tips to actuate one of the two key fob buttons. When the controller 1003 receives a command from a user through the smartphone, the controller 1003 converts the commands into specific servo motor commands that cause the provision of actuating power to the button actuator 1005, which then presses the selected remote control button on a remote control device, such as a key fob 1006. Although a key fob 1006 is shown in the drawing figures, the remote control device could be any other type of RF remote, such as a home security remote, a garage door remote or other types of remote control devices. In the embodiment illustrated in FIG. 10, the controller 1003, actuator 1005 and key fob 1006 are all contained within the enclosure 1008.

As illustrated in FIG. 14, a receiving antenna 1010 receives control commands from the smartphone of the controlling system 1001. The receiving antenna 1010 allows RF signals to be received from the smartphone. The receiving antenna 1010 is used by the controller 1003 to receive wireless commands from the controlling system 1001. It is contemplated that the receiving antenna 1010 could be a Bluetooth or other short-range antenna that is able to communicate with the controlling system 1001, such as a mobile device.

When the controller 1003 receives the command from the controlling system 1001, the controller 1003 generates motor commands which are relayed to the actuator 1005. The actuator 1005 converts the commands to actuate one or more servo motors, which cause an actuator tip of the actuator 1005 to press one or more buttons on the key fob 1006.

In a contemplated, alternate embodiment the controller 1003 could includes a separate cellular transceiver (not shown) that would allow the controller 1003 to receive commands directly from a cellular network, from either the controlling system 1001 or from a remote server. The use of a separate cellular transceiver would extend the range of the controlling system 1001 as compared to the relatively short range transceivers (i.e. Bluetooth). In this manner, the cellular transceiver would extend the communication range of the controlling system 1001, which in many cases will be a smart phone.

When the key fob button is pressed, the key fob generates an RF vehicle command signal from the internal key fob antenna 1012 in a conventional manner. Since the key fob 1006 is contained within the Faraday cage 1020, the vehicle command signal sent from the key fob antenna 1012 is isolated and is not directly received by the operating components within the vehicle.

In the shown embodiment, the command signal from the key fob antenna 1012 is received by a relay antenna 1014 that can transmit outside of the Faraday cage 1020. The vehicle command signals are relayed to the RF receiver and transmitter 1019 that is also located outside of the Faraday cage 1020. The RF receiver and transmitter 1019 include an antenna 1016 that wirelessly communicates with the keyless entry system 1022 of the vehicle. The transmitting antenna 1016 is positioned such that the controller 1003 is able to transmit RF vehicle command signals out of the enclosure 1008 for receipt by the vehicle's keyless entry and/or keyless ignition system 1022.

In the embodiment shown in FIG. 14, the controller 1003 is powered by an internal battery 1018. However, it is contemplated that the controller 1003 could also receive power from a 12-volt DC power source 1021, such as a vehicle battery.

Since the entire remote control button actuation system 1000 shown in FIG. 14 is self-contained, the actuation system 1000 could be located at various different locations within a vehicle as long as the transmissions from the transmitting antenna 1016 are strong enough to reach the vehicle's keyless entry and keyless starting systems.

The RF receiver and transmitter 1019 serve two purposes: 1) to enable receiving key fob transmissions (315-980 MHz), amplifying them and retransmitting them to the vehicle for each of the button press commands and 2) to optionally enable vehicle low-frequency RF transmissions for passive keyless functions (i.e. passive engine start) to be received by the key fob. As an alternate method of allowing low-frequency RF transmissions to be received by the key fob, a mechanical door in the Faraday Cage 1020 could be opened by a motorized control or as a function of the 3-axis button actuator 1005 pressing against a dedicated door open/close.

The actuator 1005 shown in FIG. 14 is contained within the enclosure 1008 and used to press the required and desired button on the remote control key fob 1006. Although the present disclosure contemplates the remote control as being a key fob 1006, it should be understood other types of remote control systems could be utilized while operating within the scope of the present disclosure.

As can be understood in the embodiment shown in FIG. 14, the actuator 1005 can be of various different configurations for activating control buttons on different types of remote control devices, not just the key fob shown in the figures. The actuator, controller and internal power supply, along with the remote control device, are contained within an enclosure 1008 that is formed from a metal or metalized material. The controller will include an internal antenna to receive signals from the remote control device and will include an external antenna to transmit these signals to the vehicle. The purpose for this isolation of the internal remote control device from any external RF signals is to prevent any interaction with vehicle transmitting RF antennas or attempts by thieves to perform a "man-in-the-middle" amplification attack. The metal enclosure 1008 will block any incoming RF transmissions and the only outgoing RF transmissions would be retransmissions by the controller and an antenna external to the vehicle.

Figure 15:
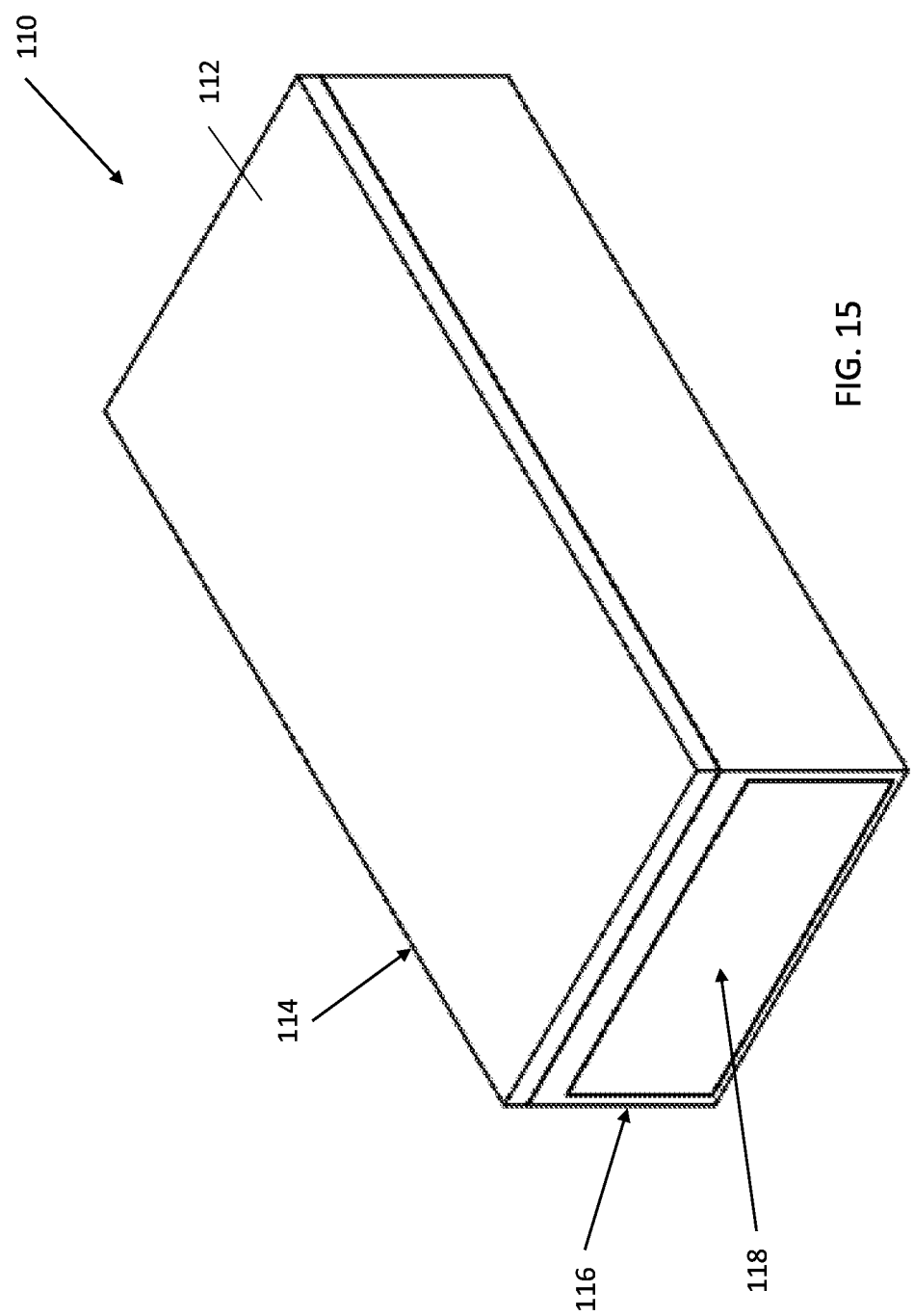
FIG. 15 is a perspective view of the outer housing of the actuation system of a second embodiment of the present disclosure.
Figure 16:
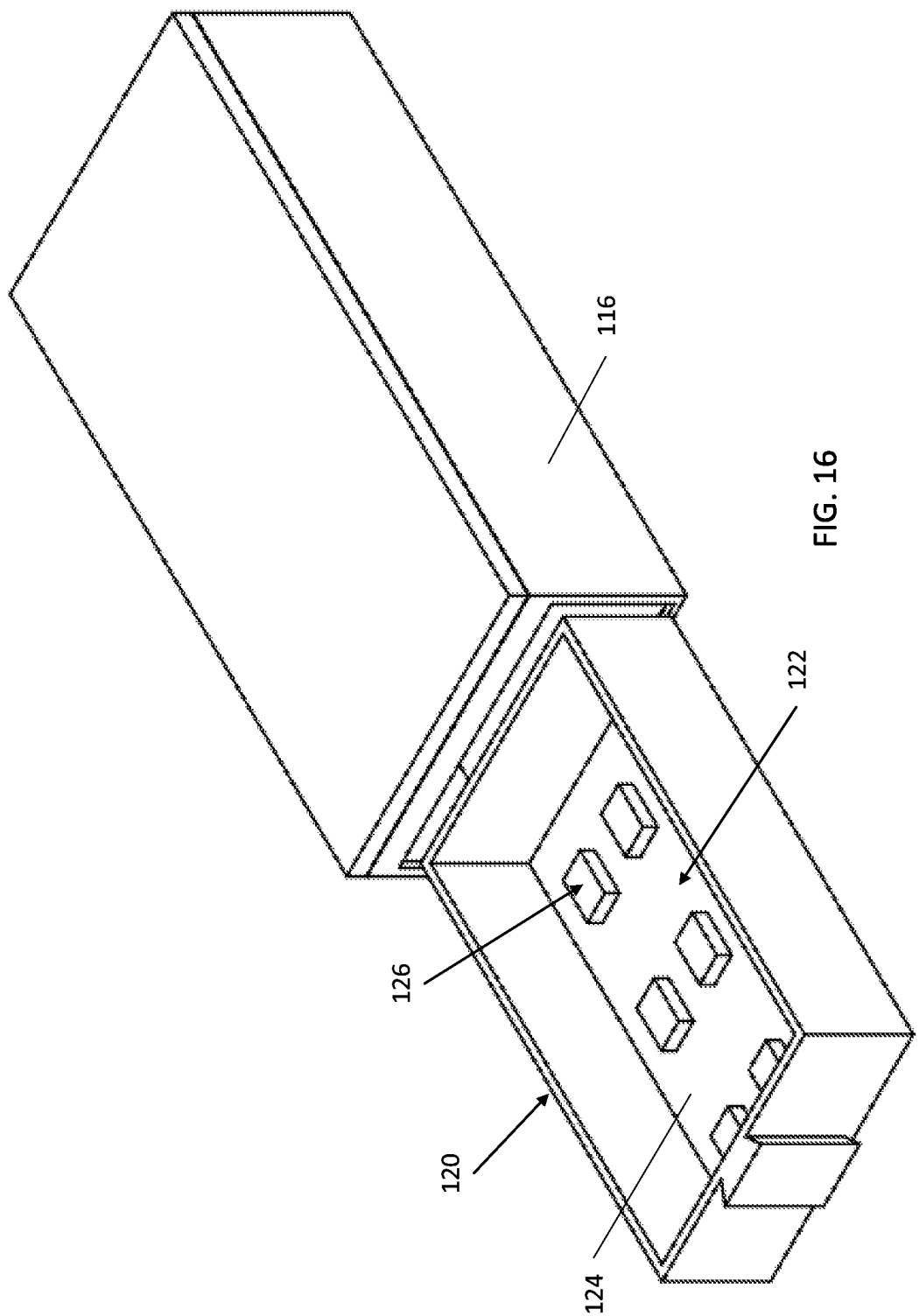
FIG. 16 is a perspective view with a drawer of the housing in an open position illustrating the adhesive pads on the support surface.

FIGS. 15 and 16 illustrate a second embodiment of an actuation system 110 used to actuate a remote control constructed in accordance with a second embodiment of the present disclosure. The actuation system 110 shown in FIG. 15 includes an outer housing 112 that includes a top portion 114, a bottom portion 116 and a door 118. The door 118 is a front portion of a drawer 120 that is removable from the bottom portion 116. The drawer 120 defines an open interior 122. The drawer 120 includes a floor 124 that includes a series of adhesive pads 126. The adhesive pads 126 are positioned on the floor 124 to secure and support one of the key fobs when the key fob is are positioned within the drawer. As with the first embodiment, the entire outer housing 112 is designed to be placed within a vehicle.

Figure 17:
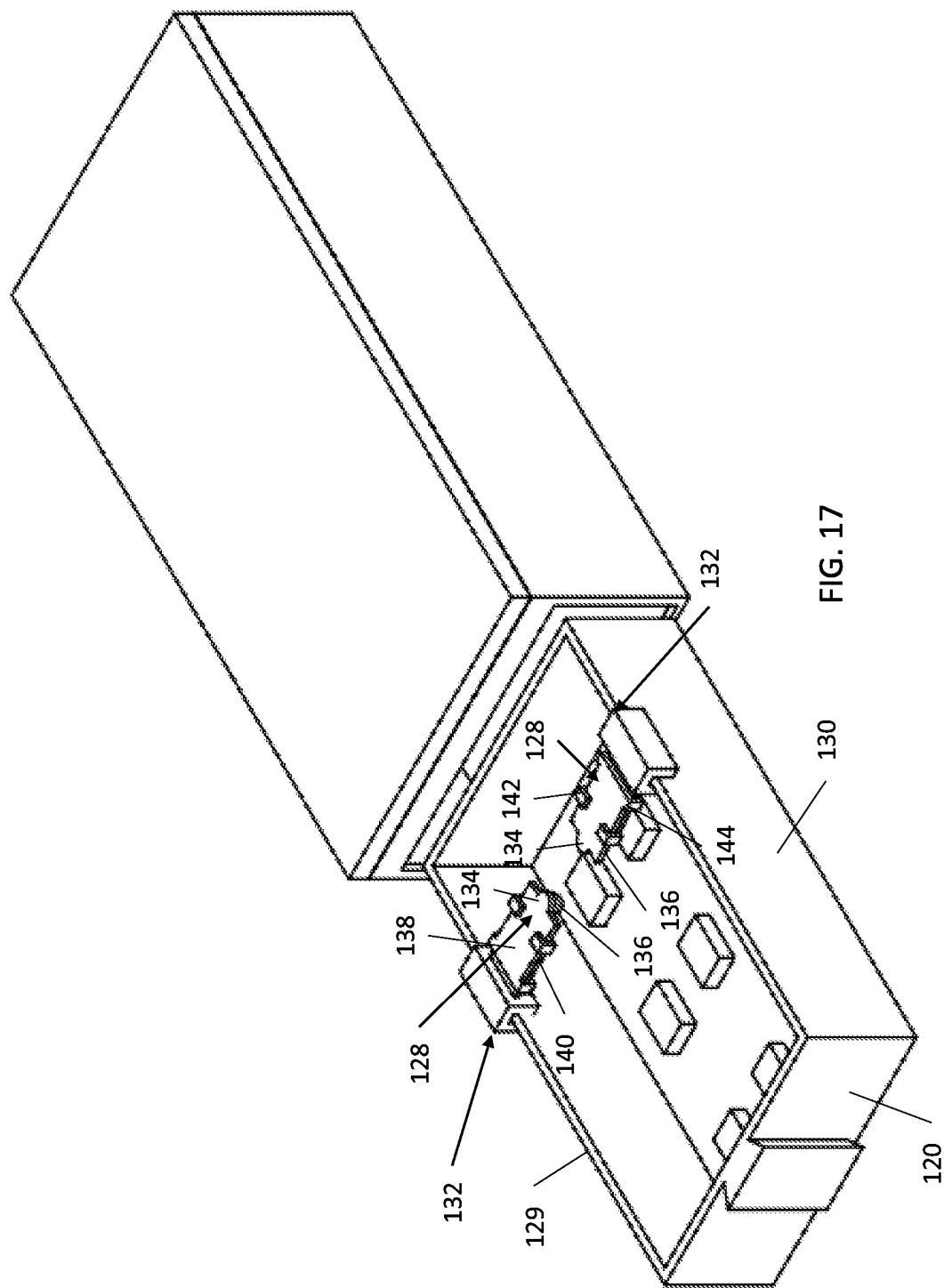
FIG. 17 is a view illustrating a pair of adjustable button actuator arms mounted to the drawer.

As illustrated in FIG. 17, the second embodiment of the actuator system 110 includes a pair of actuator arms 128 that are each mounted to a top edge 129 of the pair of spaced side walls 130 that define the drawer 120. Each of the actuator arms 128 is mounted to an actuator clip 132. The actuator clips 132 can slide along the top edge 129 to modify the position of the actuator arm 128. The outer end 134 of each actuator arm 128 includes an actuator tip 136 similar to the actuator tip 50 shown in the first embodiment. In the embodiment illustrated in FIG. 17, the actuator arm 128 includes an extension portion 138 slidably mounted relative to a fixed portion 140. The extension portion 138 can slide along the longitudinal length of the fixed portion 140 to vary the distance the outer end 134 extends relative to the side wall 130. A clip portion 142 of the fixed portion 140 engages the extension portion 138 while a clip portion 144 of the extension portion 138 engages the fixed portion 140. The frictional interaction between the extension portion 138 and fixed portion 140 allows the desired position of the actuator tip 136 to be held in place during use.

The fixed portion 140 of each of the actuator arms 128 is pivotally connected to the clamp 132 such that the actuator tip 136 can move downward to depress a button on the key fob as will be discussed in greater detail below.

Figure 18:
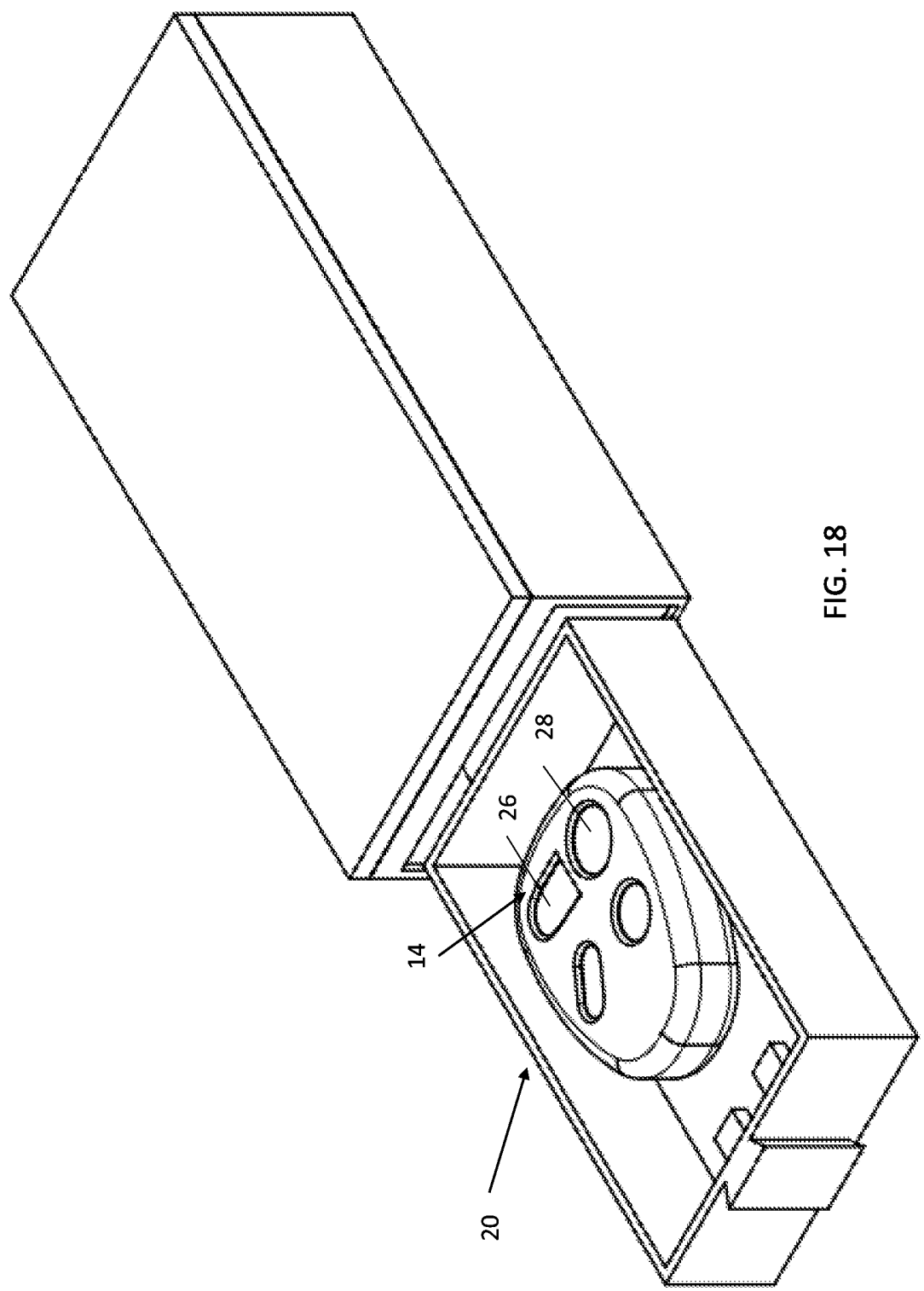
FIG. 18 is a view with the first key fob positioned in the drawer.
Figure 19:
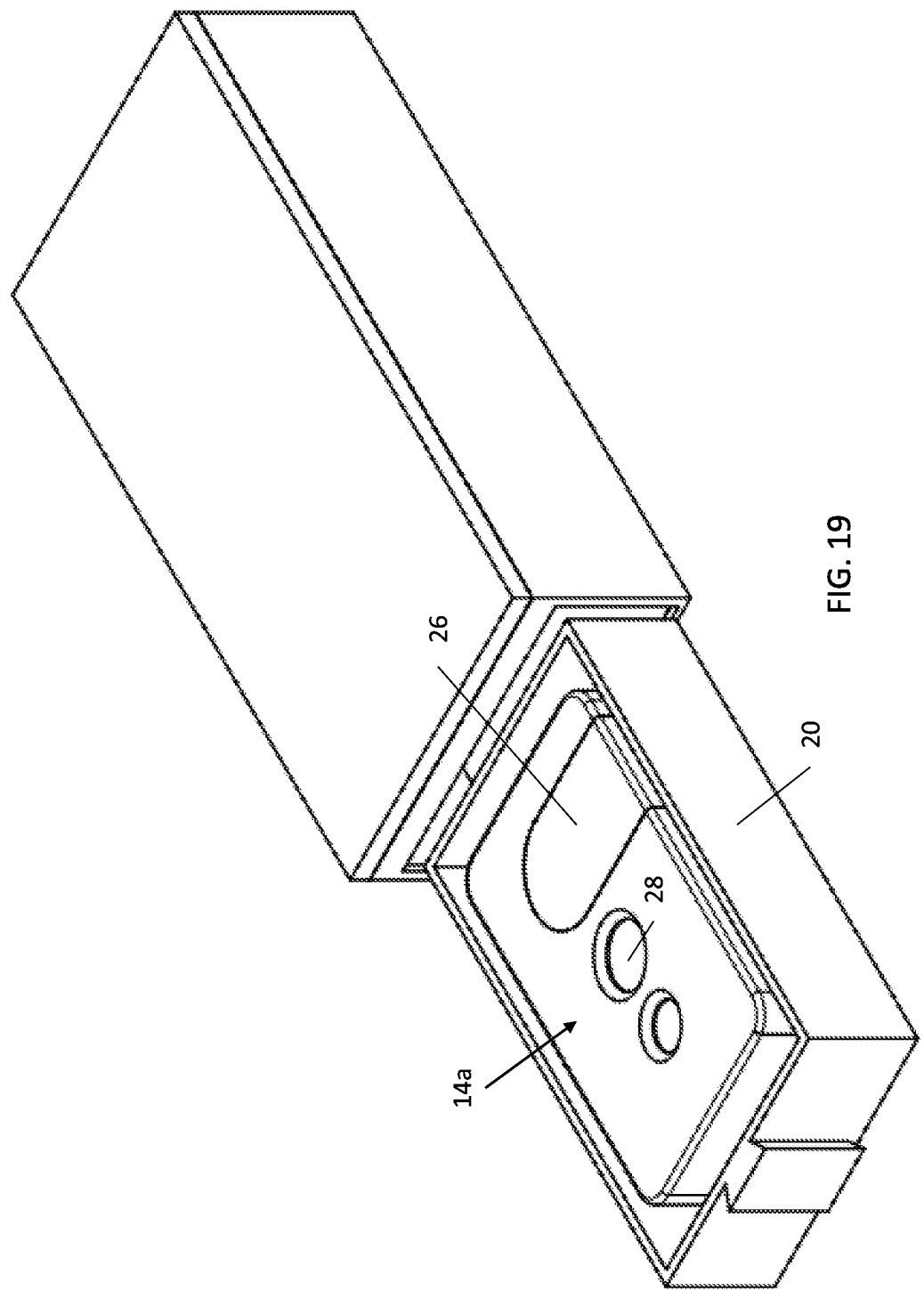
FIG. 19 is a view illustrating a second key fob in the drawer.

FIG. 18 illustrates the first type of key fob 14 positioned within the drawer 120 while FIG. 19 illustrates the second type of key fob 14A positioned within the same drawer 120. As was described in the first embodiment, both of the two key fobs 14 and 14A include a lock button 26 and an unlock button 28. Two types of key fobs 14 and 14A have the lock and unlock buttons located in different positions such that the actuation system 110 must be adjusted to work with the specific type of key fob.

Figure 20:
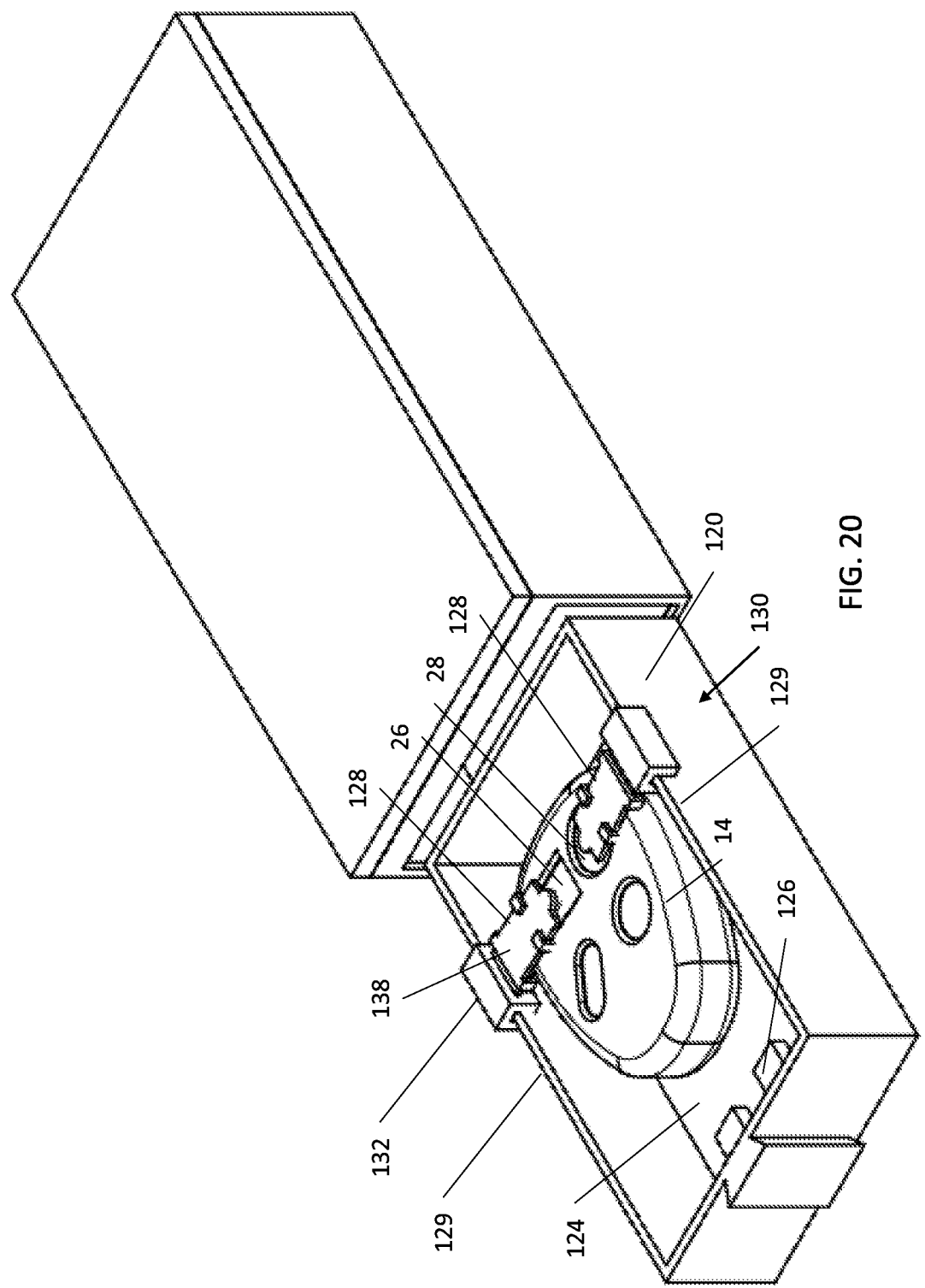
FIG. 20 is a view of the pair of adjustable button actuator arms positioned relative to the first key fob.

FIG. 20 illustrates the adjustment of the pair of actuator arms 128 relative to the key fob 14 when the key fob 14 is securely held in place on the series of adhesive pads 126 contained on the floor 124 of the drawer 120. Once the key fob 14 is positioned as shown, each of the pair of actuator arms 128 is positioned along the top edge 129 of the side wall 130 by sliding the actuator clamp 132 into the desired position. At the same time, the length of the actuator arm 128 is adjusted by moving the extension portion 138 until the actuator tip aligns with one of the two buttons 26, 28.

Figure 21:
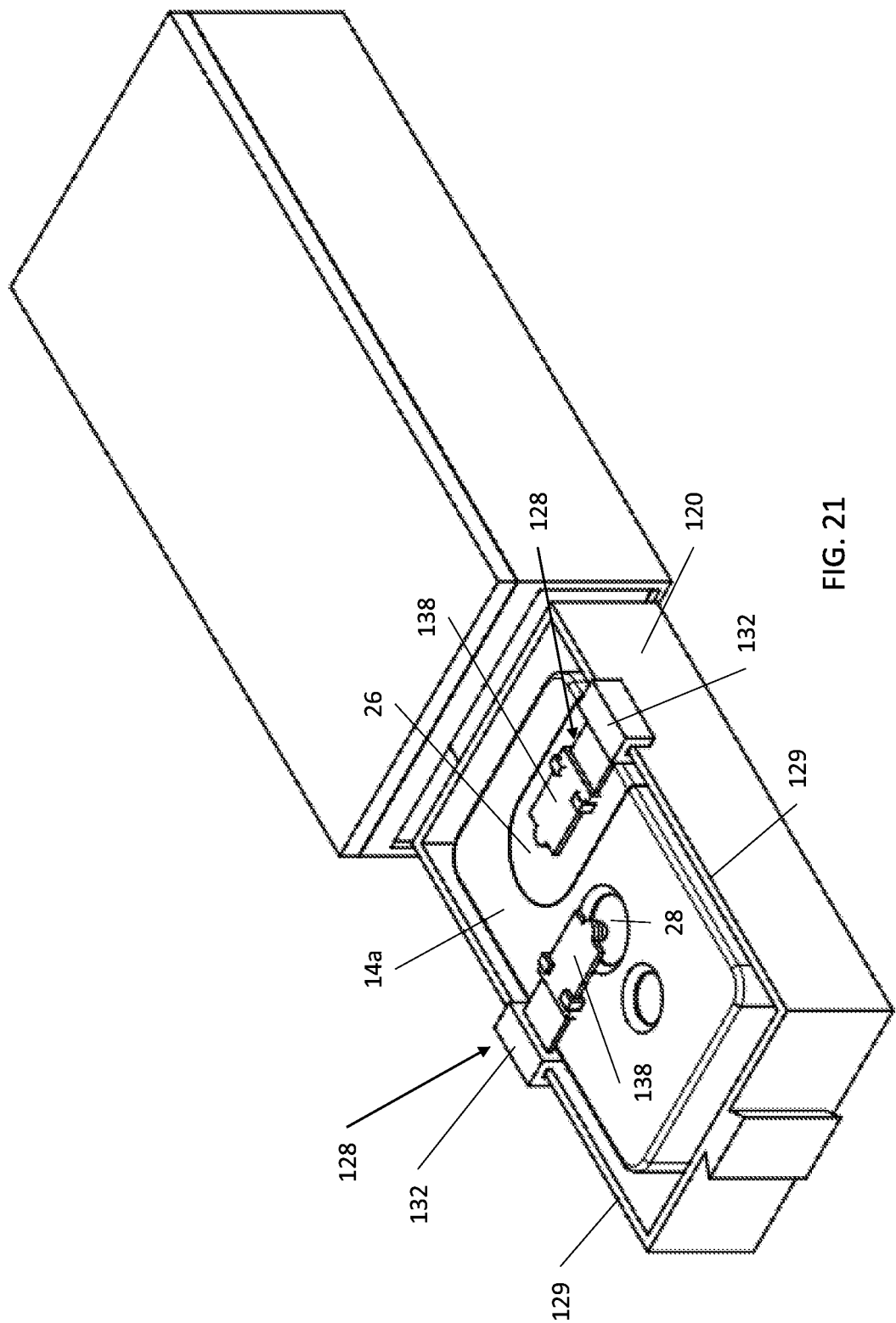
FIG. 21 is a view of the pair of adjustable button actuator arms positioned relative to the second key fob.

FIG. 21 illustrates the same adjustment that takes place for the pair of adjustment arms 128 relative to the second type of the key fob 14A. As with the embodiment shown in FIG. 20, actuator clamp 132 is slid into the desired position along the top edge 129 and the extension portion 138 adjusted. Once the pair of actuator arms 128 is adjusted as shown, the system is ready for actuation.

Figure 22:
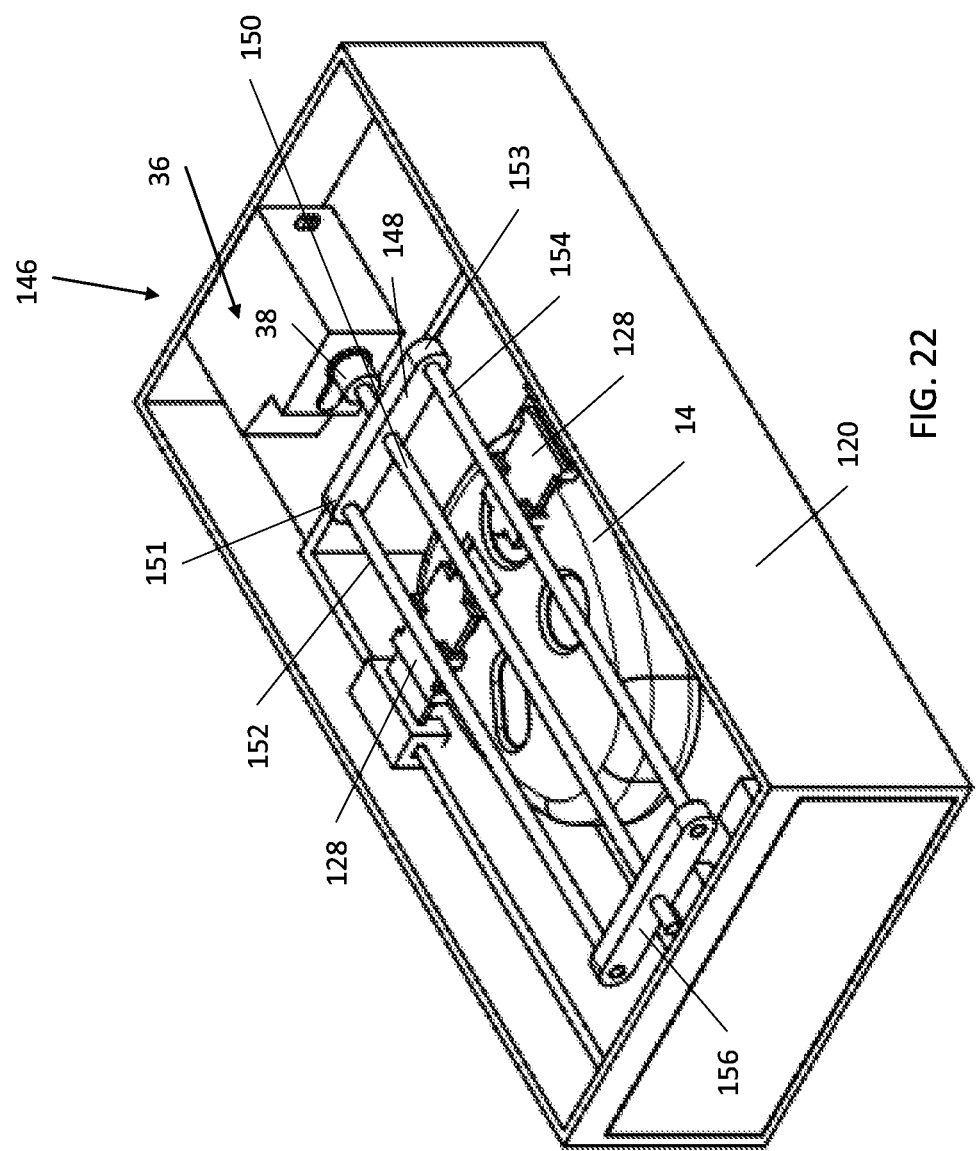
FIG. 22 is a view of the button actuator positioned on the drawer and used with the first key fob.
Figure 23:
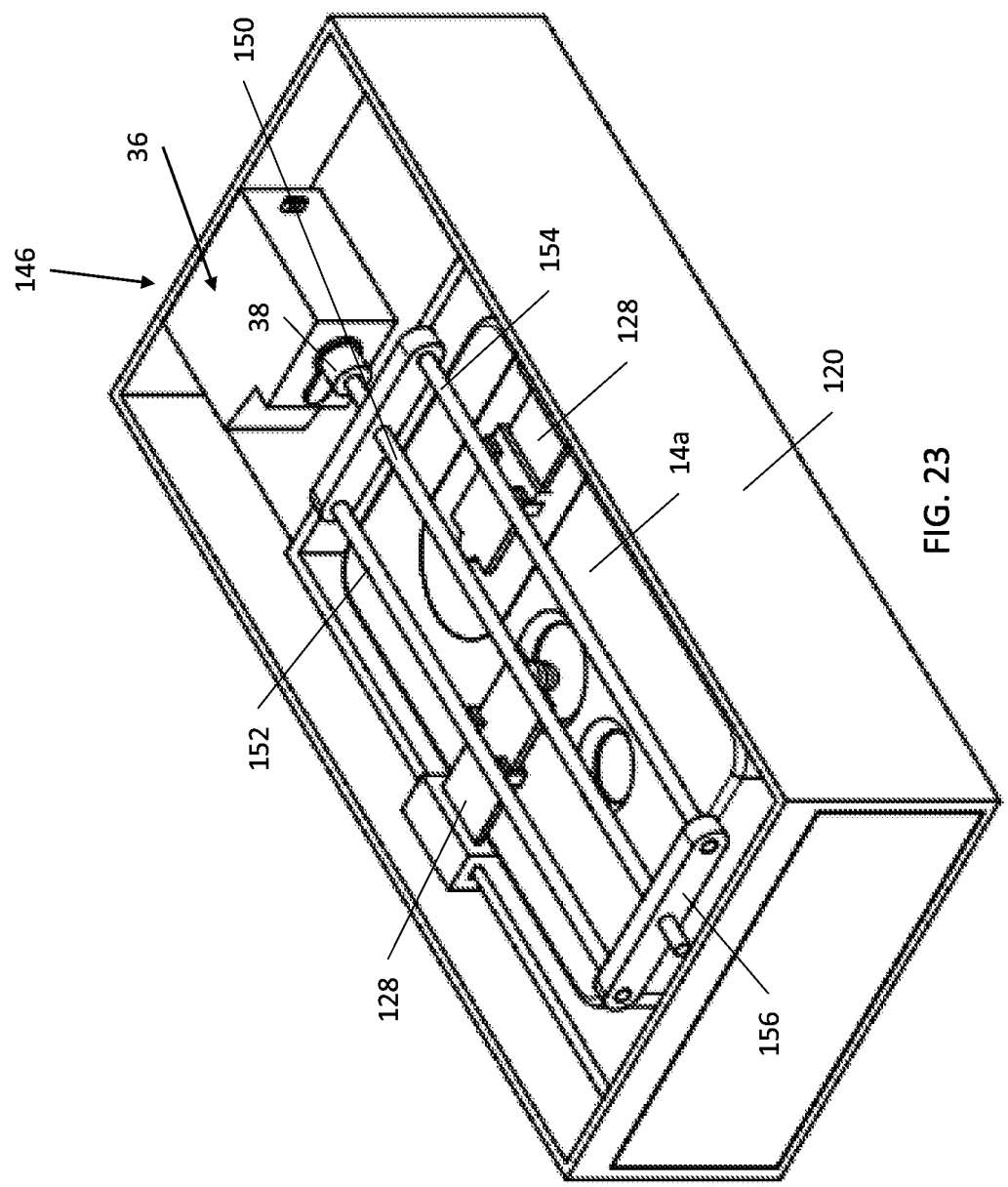
FIG. 23 is a view similar to FIG. 22 when used with the second key fob.

FIGS. 22 and 23 illustrate the position of button actuator 146 relative to the drawer 120 when either the key fob 14 or the key fob 14A is securely positioned within the drawer 120. The button actuator 146 is positioned as shown once each of the pair of actuator arms 128 is positioned and adjusted as previously described. Once the pair of actuator arms 128 is properly positioned and adjusted, the button actuator 146 is positioned as shown. The button actuator 146 includes the servo motor 36 that includes the motor shaft 38 as previously described. In the embodiment of FIGS. 22 and 23, the motor shaft 38 is connected to a linking bracket 148 through a shaft extension 150. As was described in the first embodiment, the servo motor 36 is operable to rotate the motor shaft 38 in either a clockwise direction or a counterclockwise direction. The motor shaft 38 is connected to the linking bracket 148 through the shaft extension 150 such that the linking bracket 148 can also rotate in either direction upon actuation of the servo motor 36.

The linking bracket 148 is securely mounted at a first end 151 to an end of a first actuator rod 152 and at a second end 153 to a second actuator rod 154. The shaft extension 150 extends through the linking bracket 148. Opposite ends of the first actuator rod 152 and second actuator rod 154 are received within a second linking bracket 156. The linking brackets 148 and 156 thus provide stable and secure support for each of the pair of actuator rods 152 and 154.

As can be understood in FIGS. 22 and 23, the first actuator rod 152 is positioned above the left actuator arm 128 while the second actuator arm 154 is positioned above the right actuator arm 128. Such configuration is the same during use of the actuation system with the first key fob 14 and the second key fob 14A.

Figure 24:
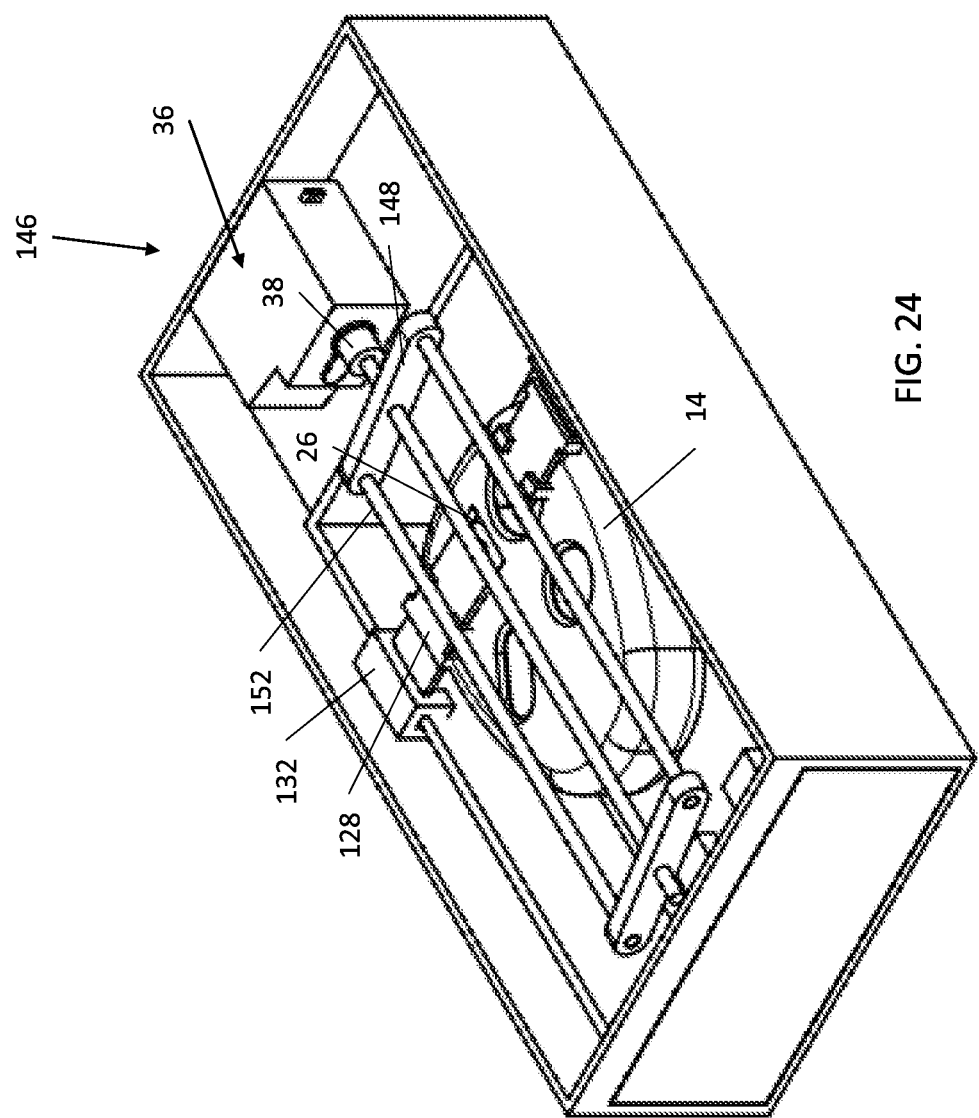
FIG. 24 is a view illustrating the actuation of a first button on the key fob.

FIG. 24 illustrates the operation of the button actuator 146 to depress the button 26 on the key fob 14. To depress the button 26, which is shown on the left side of the key fob 14, the servo motor 36 operates to rotate the drive shaft 38 in the counterclockwise direction. Such rotation causes the linking bracket 148 to rotate and the actuator rod 152 to move downward and into contact with the left actuator arm 128. Such movement causes the actuator arm 128 to pivot relative to the stationary clamp 132, causing the actuator tip to depress the button 26.

Figure 25:
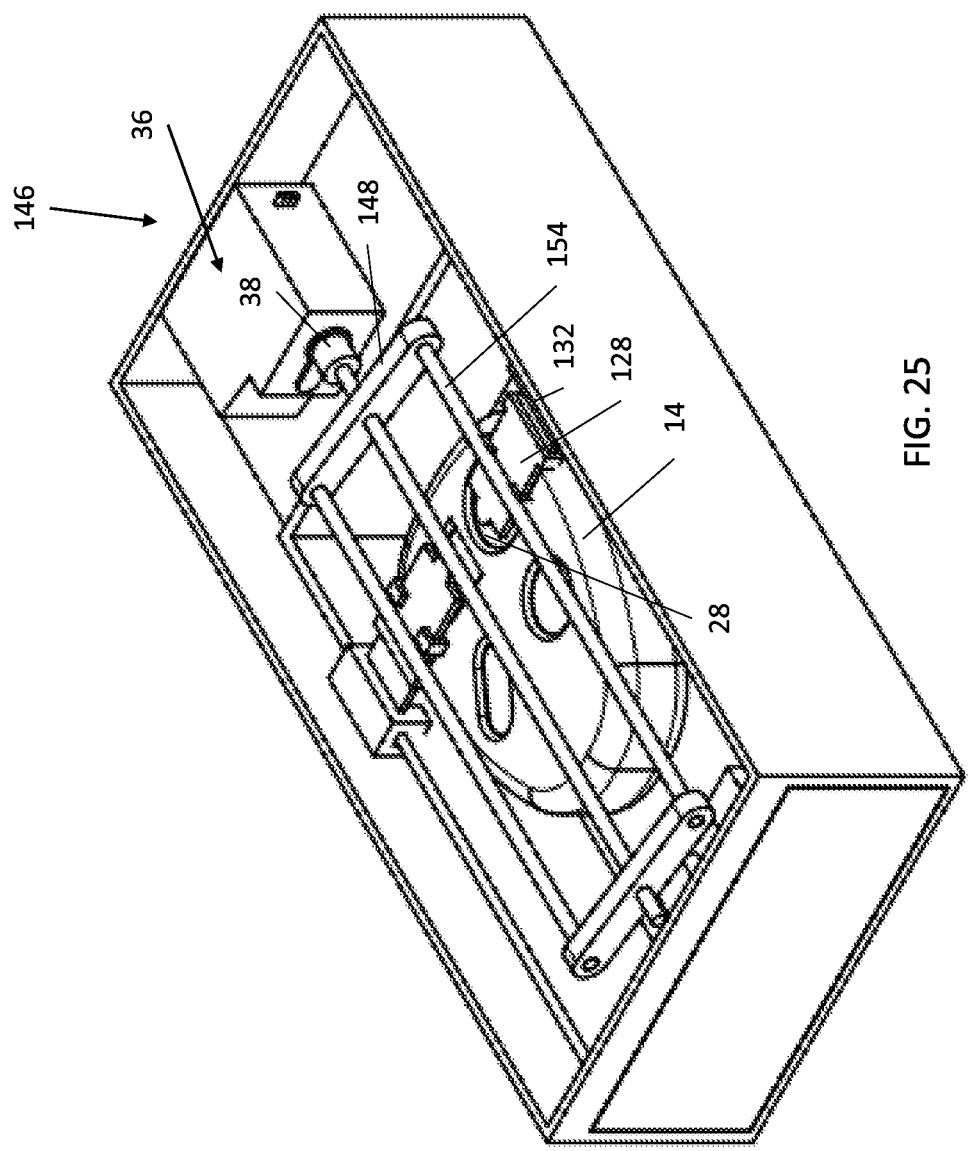
FIG. 25 is a view showing the actuation of a second button on the key fob.

FIG. 25 illustrates operation of the button actuator 146 to depress the second button 28 on the key fob 14. To carry out depression of the second button 28, the servo motor 36 rotates the motor shaft 38 in the clockwise direction, causing movement of the linking bracket 148. Such movement causes the actuator rod 154 positioned above the right actuator arm 128 to contact the actuator arm, resulting in pivoting movement of the actuator arm relative to the stationary clamp 132. During this movement, the actuator tip depresses the second button 28.

Figure 26:
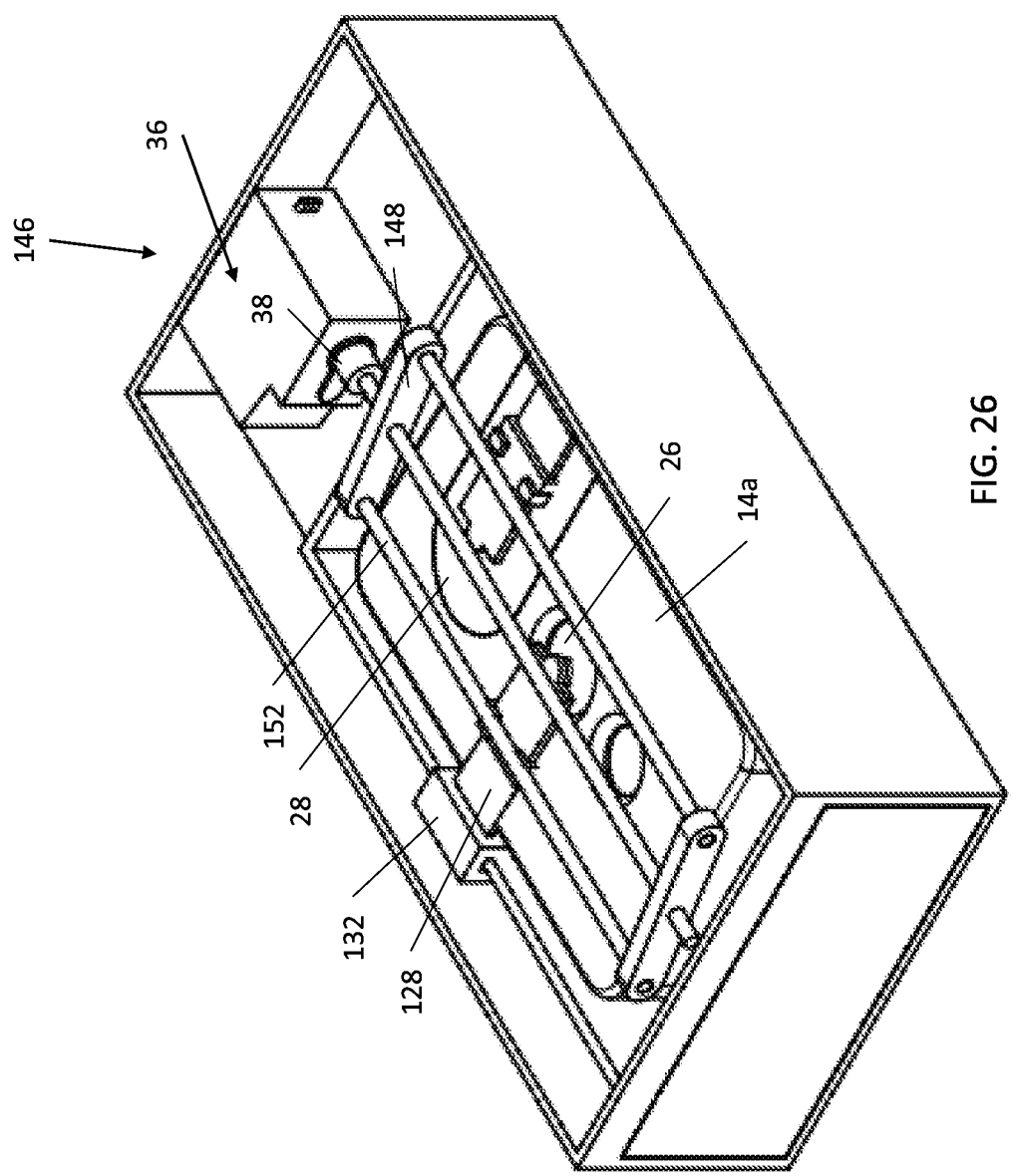
FIG. 26 is a view illustrating the actuation of a first button on the second key fob.
Figure 27:
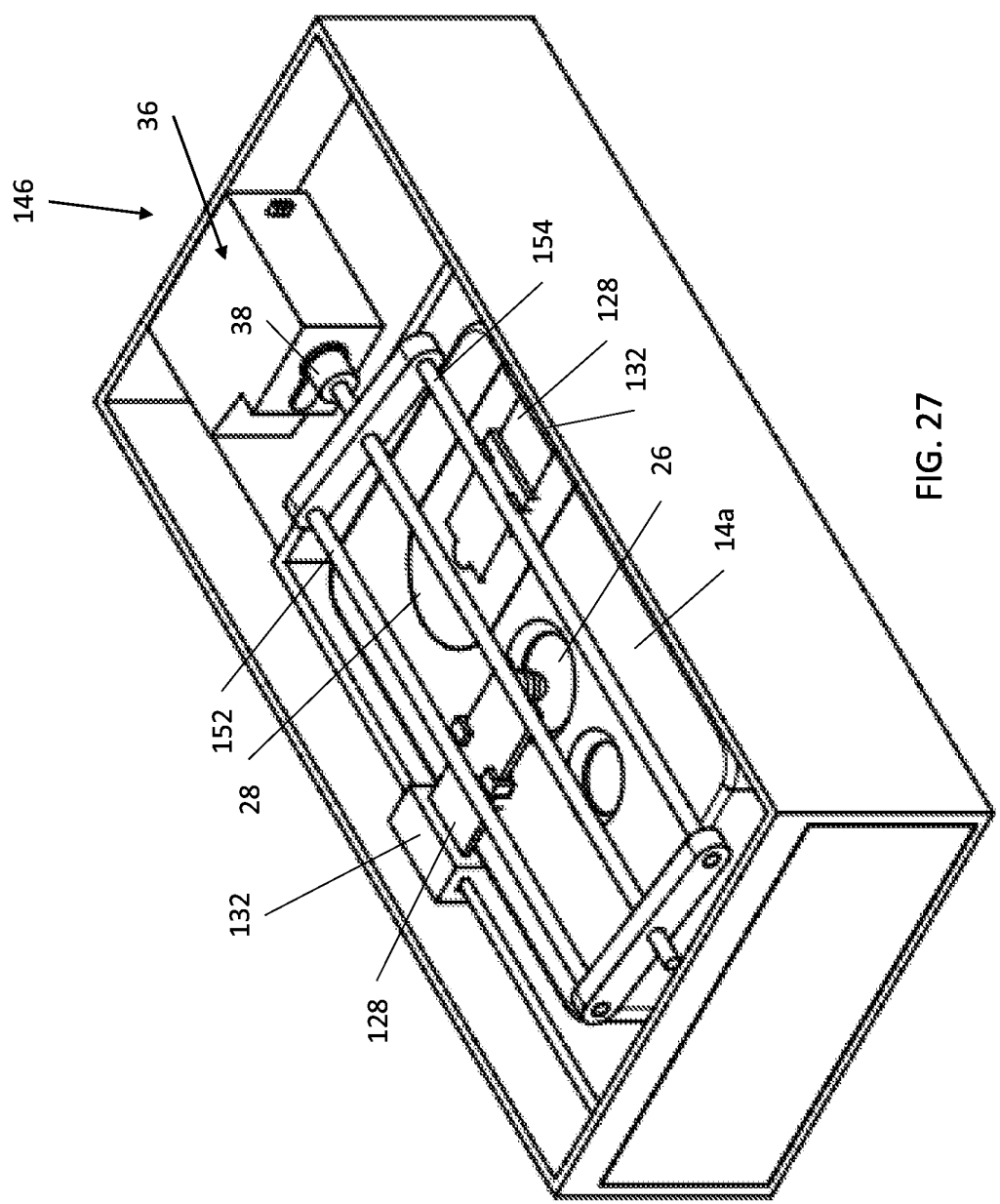
FIG. 27 is a view illustrating the actuation of a second button on the second key fob.

FIGS. 26 and 27 illustrate the same sequence of movement to depress the two buttons 26, 28 on the second key fob 14A. As can be understood in the comparison of FIGS. 24-25 to the use of the button actuator 146 with the second key fob 14A, the position of the actuator arms 128 are the only modification needed to require use of the button actuator 146.

Figure 28:
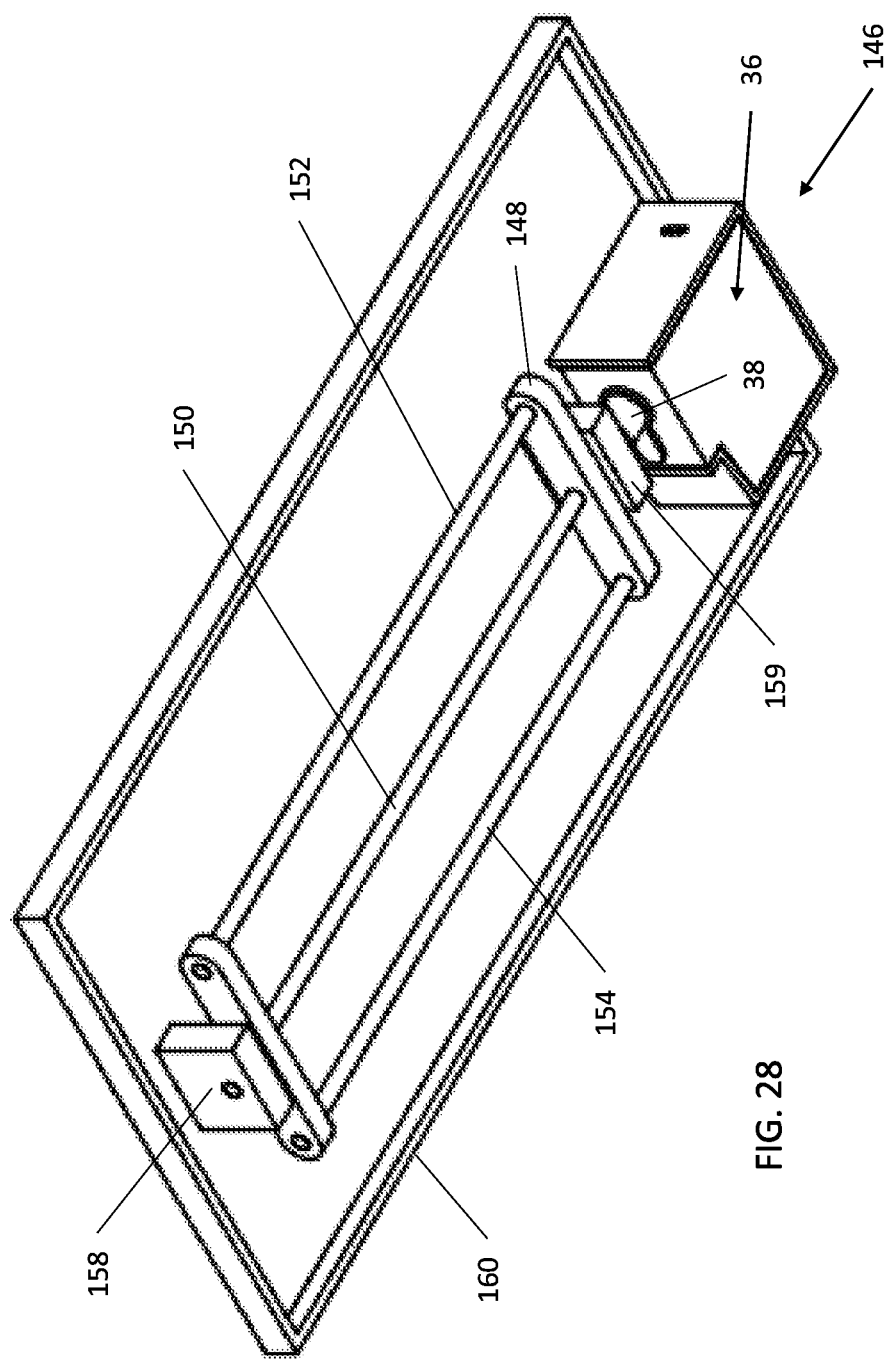
FIG. 28 is a detailed view of the button actuation assembly.

FIG. 28 is a further view illustrating the button actuator 146 of the second embodiment. As shown in the embodiment of FIG. 28, the shaft extension 150 passes through the linking bracket 156 and is received within a support bracket 158. The support bracket 158 provides support for the outer end of the shaft extension 150 to allow the pivoting movement. A second support bracket 159 is shown mounted between the motor shaft 38 and the linking bracket 148 to provide additional support for the shaft extension. In the embodiment shown in FIG. 28, the entire button actuator 146 is mounted within a support frame 160 that can be positioned relative to the drawer 120.

The second embodiment shown in FIGS. 15-28 is controlled and operated using the same system as described with reference to FIG. 14. The second embodiment of FIGS. 15-28 includes a similar actuation system as described previously.

Although the embodiment shown in the present disclosure are designed to depress two buttons on the key fob, it should be understood that the actuation system could be modified to be used with only a single button on the key fob. Further, although the key fobs shown are for use with a vehicle, the key fob could be any type of remote control actuator, such as a garage door opener. When the actuation system of the present disclosure is used with a garage door opener, one of the button actuators could be eliminated since a garage door opener will typically include only a single button. In such design, a manual push button could be included on the outer housing to allow a user to manually activate the opener when the user is physically present at the location of the outer housing.

I claim:

1. An actuation system to actuate two buttons on a remote control based on command signal generated by a mobile device, the actuation system comprising:
   an outer housing;
   a support surface configured to securely receive the remote control and securely retain the remote control within the outer housing;
   an actuator positioned within the outer housing and including two actuator tips, wherein the actuator is operable to cause the actuator tips to selectively actuate the two buttons on the remote control;
   a mounting arrangement manually adjustable to vary the longitudinal and lateral position of the actuator tips relative to the remote control; and
   a controller configured to receive the command signal from the mobile device and convert the command signal into actuation commands to cause activation of the actuator to selectively actuate the two buttons on the remote control.

2. The actuation system of claim 1 further comprising a support frame manually adjustable to vary the distance between the actuator tips and the remote control.

3. The actuation system of claim 1 wherein the actuator includes a servo motor having a motor shaft and an actuator arm mounted to the motor shaft.

4. The actuation system of claim 3 wherein rotation of the motor shaft in a first direction causes actuation of a first button on the remote control and rotation of the motor shaft in a second direction causes actuation of a second button on the remote control.

5. The actuation system of claim 4, wherein the two actuator tips are mounted to first and second ends of the actuator arm.

6. The actuation system of claim 5, wherein the first and second ends of the actuator arm are on opposite sides of the motor shaft.

7. The actuation system of claim 1 wherein the mounting arrangement is manually adjustable to vary the longitudinal and later position of the actuator within the housing and relative to the remote control.

8. The actuation system of claim 3 wherein the actuator includes a pair of actuator arms each mounted to a side wall of a drawer included within the outer housing, each of the actuator arms being independently movable along the side wall relative to the remote control.

9. The actuation system of claim 8 wherein each actuator arm including an actuator tip mounted at an end of the actuator arm.

10. The actuation system of claim 9 wherein each of the actuator arms is adjustable to vary the distance from the actuator tip to the side wall.

11. The actuation system of claim 10 wherein the actuator includes a servo motor having a motor shaft and a linking bracket mounted to the motor shaft, wherein the servo motor is operable to rotate the motor shaft in both a clockwise and counterclockwise direction to selectively depress one of the two buttons on the remote control.

12. The actuation system of claim 11 wherein the linking bracket includes a first actuator rod connected to a first end of the linking bracket and a second actuator rod connected to a second end of the linking bracket, wherein the first actuator rod is in contact with a first actuator arm and the second actuator rod is in contact with a second actuator arm.

13. The actuation system of claim 12 wherein the first and second ends of the linking bracket are located on opposite sides of the motor shaft.

14. The actuation system of claim 13 wherein rotation of the motor shaft in the clockwise direction causes the first actuator rod to move the actuator tip of the first actuator arm into contact with one of the buttons of the remote control and rotation of the motor shaft in the counterclockwise direction causes the second actuator rod to move the actuator tip of the second actuator arm into contact with another one of the buttons of the remote control.

15. The actuation system of claim 1, wherein the mobile device is configured to transmit wireless command signals corresponding to the two buttons, wherein the controller is configurable to operate the actuator to depress a selected button of the plurality of buttons a particular distance and for a particular interval of time such that the wireless mobile device is operably linked to the actuation of the plurality of buttons on the remote control.

16. The actuation system of claim 1 wherein the outer housing defines an isolation enclosure, wherein the remote control is contained within the isolation enclosure, wherein the isolation enclosure is configured to prevent radio frequency (RF) signals from reach the remote control from outside of the isolation enclosure.

17. The actuation system of claim 16 wherein the isolation enclosure is formed from a metallic material.

18. An actuation system to actuate two buttons on a remote control based on command signal generated by a mobile device, the actuation system comprising:
- an outer housing including a removable drawer;
- a support surface included within the removable drawer and configured to securely receive the remote control and securely retain the remote control within the drawer of the outer housing;
- a pair of actuator arms each mounted to a side wall of the drawer included within the outer housing, each of the actuator arms being independently movable along the side wall relative to the remote control, each actuator arm including an actuator tip mounted at an end of the actuator arm, wherein each of the actuator arms is adjustable to vary the distance from the actuator tip to the side wall;
- an actuator including a servo motor having a motor shaft and a linking bracket mounted to the motor shaft, wherein the servo motor is operable to rotate the motor shaft in both a clockwise and counterclockwise direction to selectively depress one of the two buttons on the remote control; and
- a controller configured to receive the command signal from the mobile device and convert the command signal into actuation commands to cause activation of the actuator.

19. The actuation system of claim 18 wherein the linking bracket includes a first actuator rod connected to a first end of the linking bracket and a second actuator rod connected to a second end of the linking bracket, wherein the first actuator rod is in contact with a first actuator arm and the second actuator rod is in contact with a second actuator arm.

20. The actuation system of claim 19 wherein rotation of the motor shaft in the clockwise direction causes the first actuator rod to move the actuator tip of the first actuator arm into contact with one of the buttons of the remote control and rotation of the motor shaft in the counterclockwise direction causes the second actuator rod to move the actuator tip of the second actuator arm into contact with another one of the buttons of the remote control.

\* \* \* \* \*